United States Patent [19]
Muramatsu

[11] Patent Number: 5,162,918
[45] Date of Patent: Nov. 10, 1992

[54] COPYING APPARATUS WITH DISPLAY OF BOTH DOCUMENT IMAGE AND FRAME OF DOCUMENT CONTOUR

[75] Inventor: Hideo Muramatsu, Osaka

[73] Assignee: Minolta Camera Kabushiki Kaisha, Japan

[21] Appl. No.: 463,142

[22] Filed: Jan. 9, 1990

[30] Foreign Application Priority Data

| Jan. 13, 1989 | [JP] | Japan | 1-7503 |
| Jan. 13, 1989 | [JP] | Japan | 1-7504 |
| Jan. 13, 1989 | [JP] | Japan | 1-7505 |
| Jan. 13, 1989 | [JP] | Japan | 1-7506 |
| Jan. 13, 1989 | [JP] | Japan | 1-7507 |

[51] Int. Cl.⁵ .................. H04N 1/29; H04N 1/38; H04N 1/387
[52] U.S. Cl. .................. 358/300; 358/451; 358/452; 358/453; 358/488
[58] Field of Search ........... 358/300, 296, 401, 443, 358/449, 451, 452, 453, 488

[56] References Cited

U.S. PATENT DOCUMENTS

4,740,814 4/1988 Folkins.
4,788,578 11/1988 Tamura .................. 358/451
4,802,229 1/1989 Yamada .................. 358/443
4,814,893 3/1989 Katoh .................. 358/451
4,816,866 3/1989 Yamada.

FOREIGN PATENT DOCUMENTS

61-3130 1/1986 Japan.
62-52545 3/1987 Japan.
62-99769 5/1987 Japan.

Primary Examiner—Benjamn A. Fuller
Assistant Examiner—Scott A. Rogers

[57] ABSTRACT

A digital copying apparatus including an image reader for reading a document, an engine portion for conducting copying operation and a liquid-crystal display or displaying an image of the document read by the image reader, in which an image edition mode for conducting the image editing such as trimming and erasing of the document image is provided, and frames necessary for image editing such as a document frame indicating a document position automatically, a frame indicating a size of a copy paper on which the image is formed and a frame indicating a copiable area in the image edition mode, are displayed on the liquid-crystal display together with the document image.

8 Claims, 48 Drawing Sheets

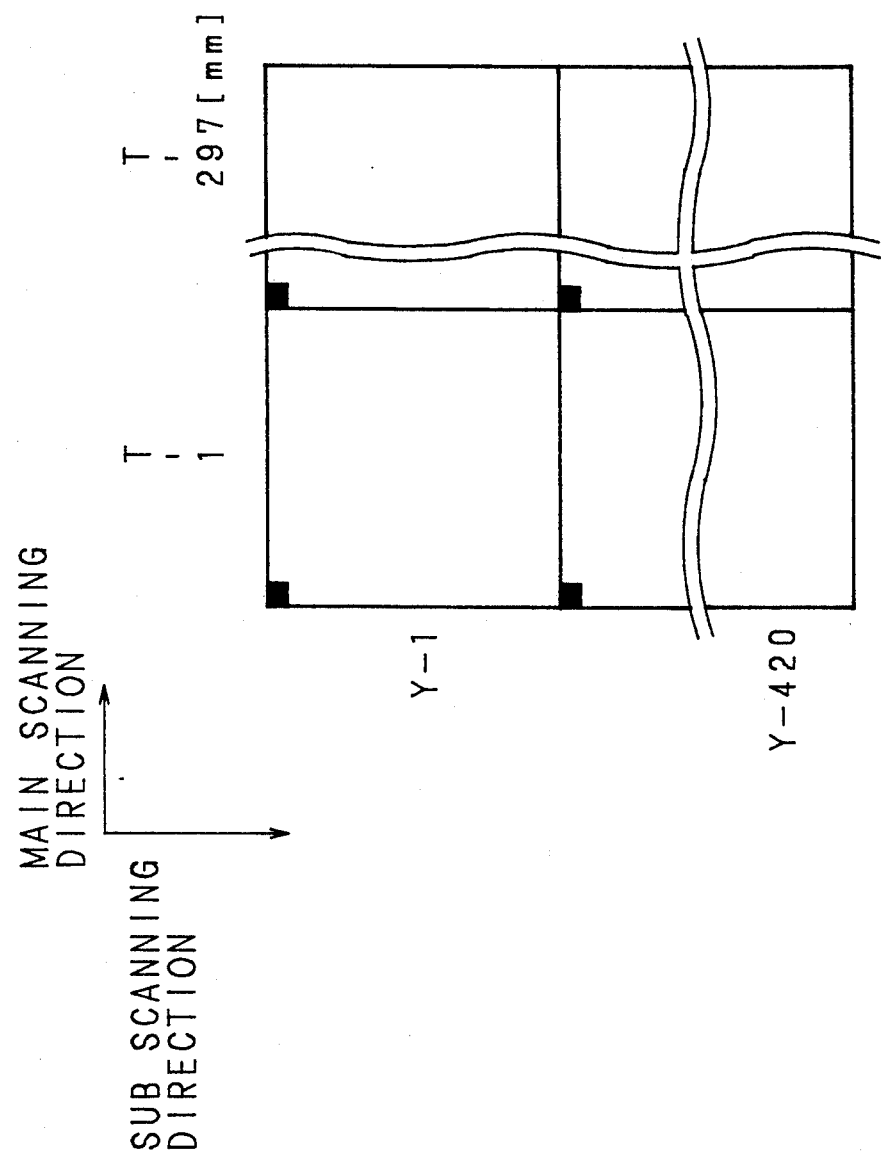

Fig. 22

| STATE OF ATTACHED MAGNET 501 a b c d | PAPER SIZE ORIENTATION | WIDTH [mm] | LENGTH [mm] |
|---|---|---|---|
| 0000 | | | |
| 0001 | | | |
| 0010 | | | |
| 0011 | | | |
| 0100 | B5LENGTH | 182 | 257 |
| 0101 | A4LENGTH | 210 | 297 |
| 0110 | B4LENGTH | 257 | 364 |
| 0111 | A3LENGTH | 297 | 420 |
| 1000 | | | |
| 1001 | | | |
| 1010 | B5WIDTH | 257 | 182 |
| 1011 | A4WIDTH | 297 | 210 |
| 1100 | | | |
| 1101 | | | |
| 1110 | | | |
| 1111 | | | |

0:MAGNET ABSENCE
1:MAGNET PRESENCE

Fig. 36

| "θ"[°] | "Vc" | TIMER VALUE TM (x,y)(msec) | |
|---|---|---|---|
| | | MENU CURSOR | POINTING CURSOR |
| 55~60 | 5 | 200 | 10 |
| 40~55 | $0.007619 \cdot \theta^2 - 0.4571 \cdot \theta + 7.091$ | 200 ~ 1000 | 10 ~ 50 |
| 35~40 | 1 | 1000 | 50 |
| 25~35 | 0 | ∞ | ∞ |
| 20~25 | 1 | 1000 | 50 |
| 5~20 | $0.007619 \cdot \theta^2 - 0.4571 \cdot \theta + 7.091$ | 1000 ~ 200 | 50 ~ 10 |
| 0~5 | 5 | 200 | 10 |

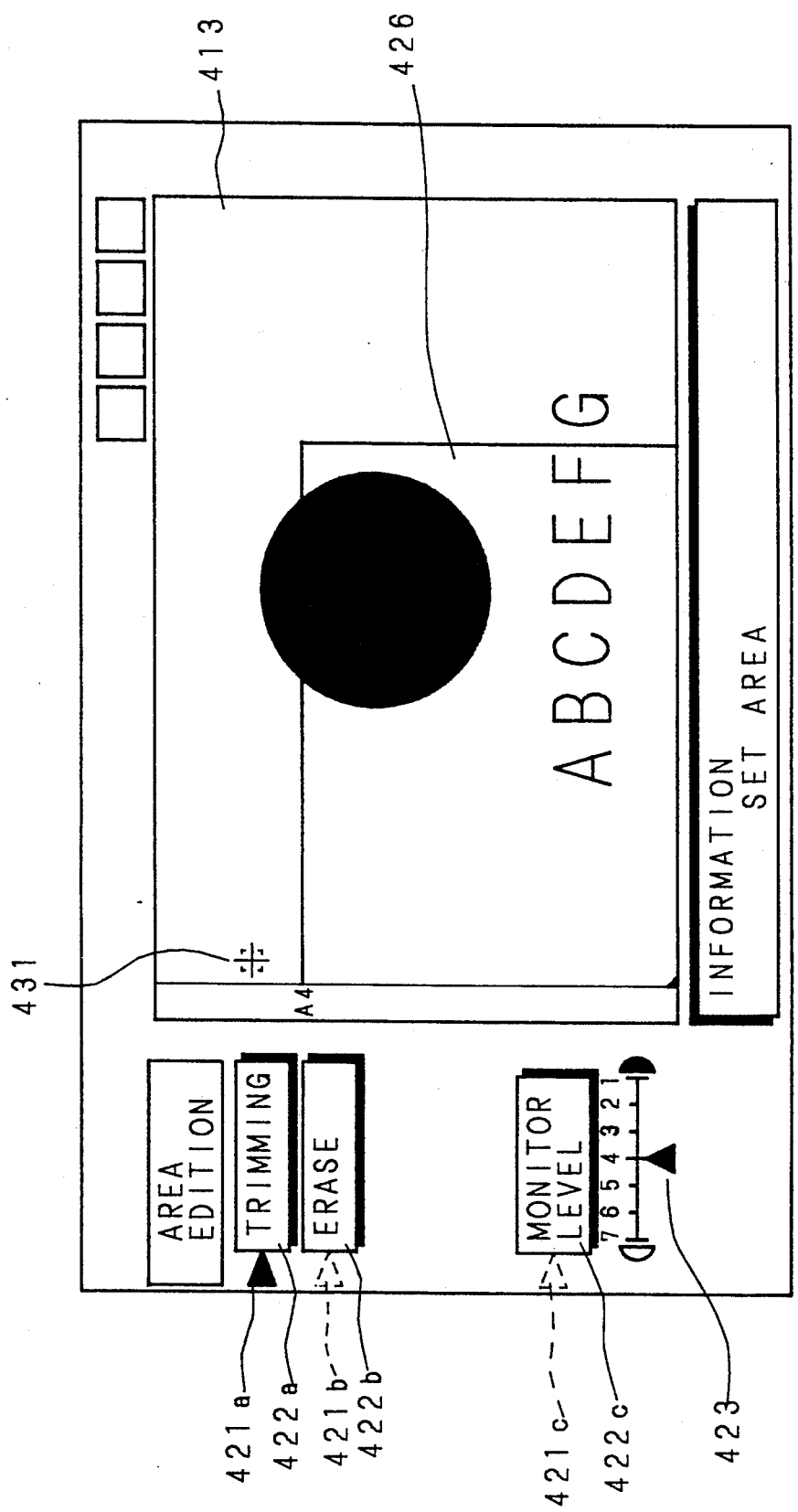

COPYING APPARATUS WITH DISPLAY OF BOTH DOCUMENT IMAGE AND FRAME OF DOCUMENT CONTOUR

BACKGROUND OF THE INVENTION

1. Field of the Invention

The present invention relates to a copying apparatus, more particularly, it relates to a copying apparatus having a display function which displays an image to be copied to confirm the image in advance.

2. Description of Related Art

A copying apparatus having editing functions such as selectively copying only a part of a document or copying with an arbitrary copying magnification is well known. In such a copying apparatus, there is a demand of the operator to confirm an edited image to be copied before actually obtaining a hard copy. Therefore, the copying apparatus having a display function which displays the image to be copied on a liquid crystal panel has been proposed (Japanese Patent Application Laid-Open No. 62-99769).

In the copying apparatus including the display function, an edited image can be confirmed beforehand and be easily added or modified based on confirmation of the displayed image.

However, in the copying apparatus disclosed in 62-99769, since only the image of the document is displayed, a position of the document could not be confirmed. As the result, such a problem was encountered that the copying operation is spoiled by inadequate positioning of the document.

Meanwhile, a copying apparatus disclosed in Japanese Patent Application Laid-Open No. 61-3130 is designed to indicate the copiable area on a document table by irradiating laser light from below the document table. In the copying apparatus disclosed in Japanese Patent Application Laid-Open No. 62-52545, luminous elements are provided on the edge of an original glass plate to indicate the copiable area.

By the way, what the operator wants to know before the actual copying operation is not only the copiable area but the image to be copied actually on the paper. In the document having a large blank space or the document of which the image is unevenly distributed, even when the document is larger than the copiable area, the image may be copied on the paper by the appropriate positioning of the document. Accordingly, in the copying apparatus disclosed in 61-3130 and 62-52545, since the image to be copied is not displayed, the operator can not determine whether or not the image of the document is accurately copied on the paper, before the actual copying operation.

SUMMARY OF THE INVENTION

The present invention has been devised in view of such circumstances, therefore, it is a primary object thereof to provide a copying apparatus, in which a frame indicating a position of a document and an image of the document to be copied are displayed so that the operator can confirm a document area beforehand.

It is another object of the present invention to provide a copying apparatus, in which a frame indicating a copiable area (effective image area) and an image of a document are displayed, so that a relative position between the image and the copiable area can be confirmed in advance.

It is a further object of the present invention to provide a copying apparatus, in which a frame indicating a paper size and an image of a document are displayed, so that the relationship between the image and the paper is obvious at a glance before the actual copying operation.

It is still another object of the present invention to provide a copying apparatus, in which an image to be copied is displayed every time an area edition mode has been selected.

The above and further objects and features of the invention will more fully be apparent from the following detailed description with accompanying drawings.

BRIEF DESCRIPTION OF THE DRAWINGS

FIG. 22 is a table showing the relationship between a paper size and position and a magnet mounting position, FIG. 36 is a table showing the relationship between the rotation angle of the joy ball and the processing speed and reference timer values, FIGS. 39~41 are schematic views showing the contents displayed on a liquid-crystal display panel of a second embodiment.

DESCRIPTION OF THE PREFERRED EMBODIMENTS

In the following, the present invention will be described specifically with reference to the drawings showing its embodiments.

Figure 1:
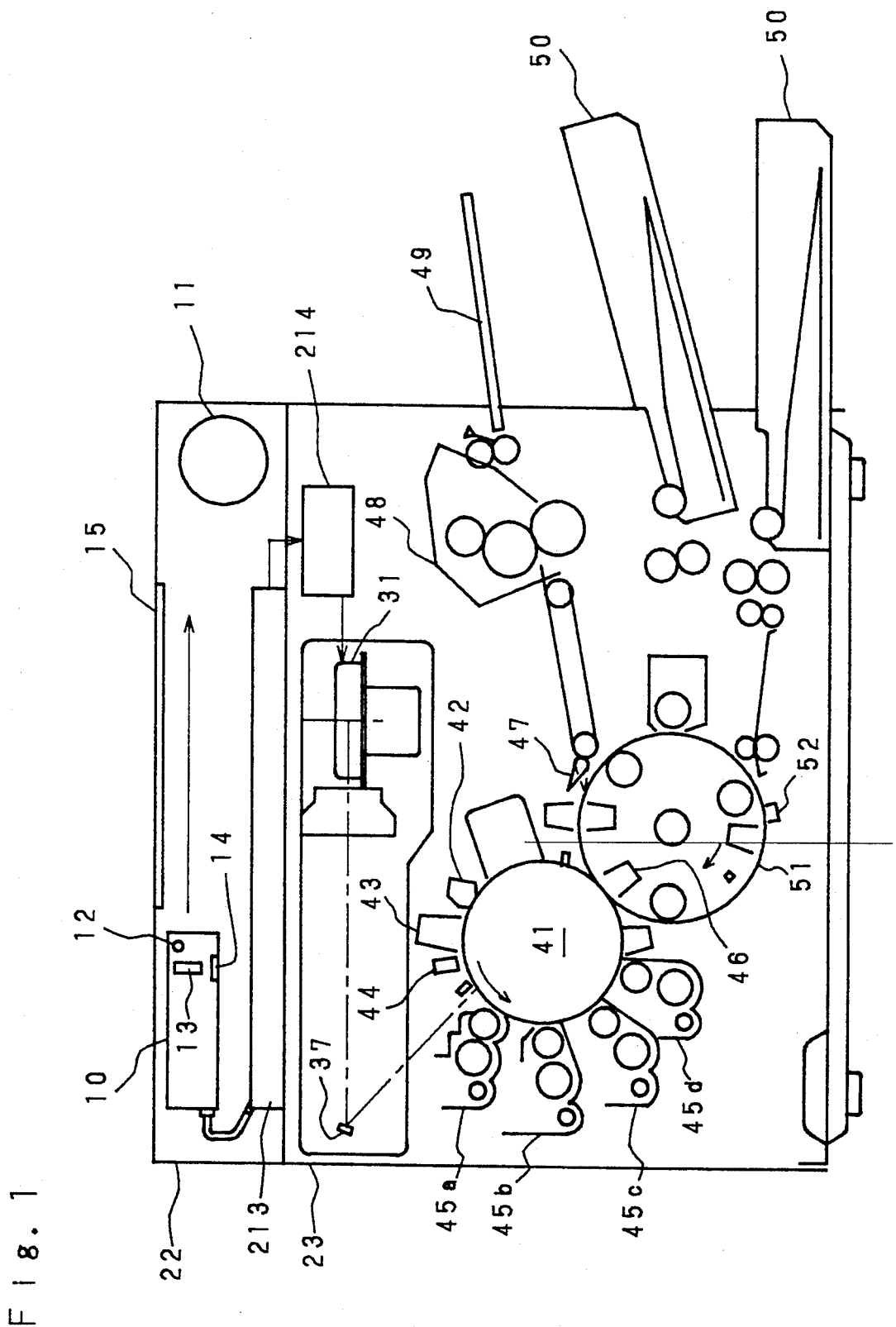
FIG. 1 is a longitudinal sectional construction view of a copying apparatus according to the present invention.

In FIG. 1, numeral 22 indicates an image reader for reading a document image, and 23 denotes an engine portion which actually executes the copying operation on the basis of image information.

The image reader 22 comprises a scanner 10 which reads an image of the document set on an original glass plate 15, a scanning motor 11 which moves the scanner 10 horizontally and an image signal processing circuit 213 for processing image signals from the scanner 10, etc. The scanner 10 comprises a light source 12 which illuminates the document, a focusing rod lens array 13 which projects light reflected from the surface of the document to a color-CCD linear image sensor 14 which generates image signals based on the image. Image data of the document is converted into an electrical signal by the color-CCD linear image sensor 14, thereafter signal-processed in the image signal processing circuit 213 and sent to a laser-diode drive circuit 214. The circuit 214 provides an ON-OFF signal to a laser diodes so as to emit a laser beam modulated according to image data. The laser beam is projected onto a photosensitive drum 41 for exposure via a polygon mirror 31 and a plane mirror 37.

The photosensitive drum 41 is designed to rotate counterclockwise in the direction shown by the arrow, and an electrification charger 43 is provided above the rotating zone on the periphery thereof. The photosensitive drum 41 is subjected to the exposure after being charged by the electrification charger 43. On the downstream side of the electrification charger 43 around the photosensitive drum 41, a LED array 44 for preventing an excessive toner from adhering is provided, and on the downstream side of the LED array 44, developing devices 45a, 45b, 45c and 45d respectively for yellow, cyan, magenta and black are disposed in this order. Underneath the photosensitive drum 41, there is provided a transfer charger 46 which transfers a toner image onto copy paper. On the upstream side of the electrification charger 43, an eraser lamp 42 which removes a residual charge on the photosensitive drum 41 is installed.

The engine portion 23 includes, in addition to the photosensitive drum 41, a transfer drum 51, a fixing unit 48, a paper discharge tray 49 and two paper feed trays 50, etc. The transfer drum 51 is installed in parallel and adjacent to the photosensitive drum 41, and includes, on the peripheral surface thereof, a chucking claw 52 for holding the copy paper onto which the image is to be transferred. The transfer drum 51 is driven to rotate in the direction of the arrow. The copy paper drawn out from the paper feed tray 50 is fixed to the peripheral surface of the transfer drum 51 at its front edge by the chucking claw 52. When the front edge of the copy paper reaches the transfer charger 46 in synchronism with the toner image on the photosensitive drum 41 facing the transfer charger 46, the toner image is transferred successively onto the copy paper. A transferring process of the colored toners is conducted in such a manner that, on the first rotation of the photosensitive drum 41 and the transfer drum 51, it is processed for the yellow toner, on the second rotation for the magenta toner, on the third rotation for the cyan toner and on the fourth rotation for the black toner. After four transferring processes for one copy paper are finished, the chucking claw 52 is loosened and the copy paper is separated from the peripheral surface of the transfer drum 51 by a separation claw 47. Then, the copy paper is discharged on the paper discharge tray 49 after the fixing operation by the fixing unit 48.

Figure 2:
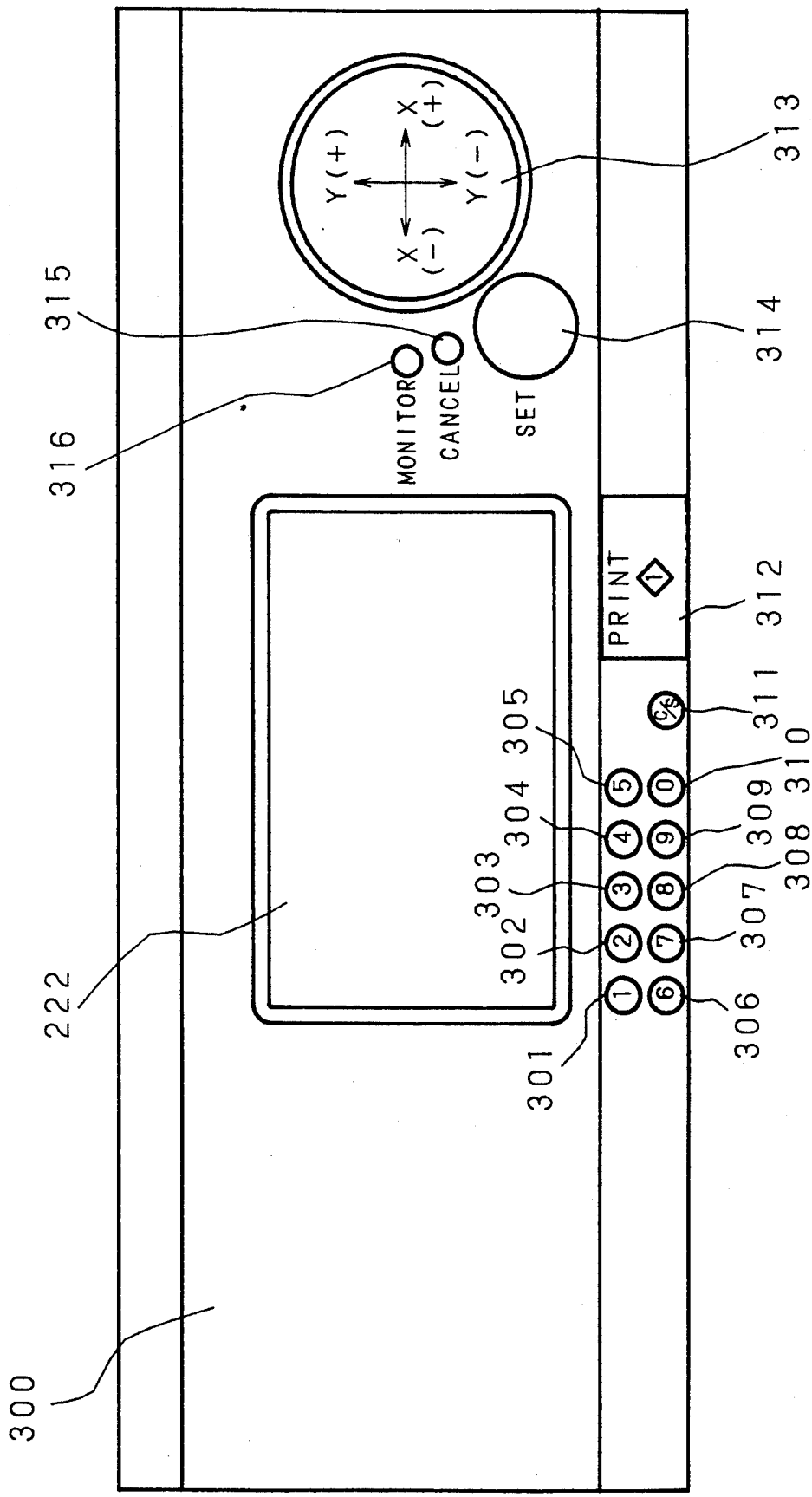
FIG. 2 is a schematic plan view of a control panel.

FIG. 2 is a schematic plan view of a control panel 300 of a copying apparatus. On the front side of the control panel 300, ten-keys 301~310 for registering the number of copy paper, etc., a clear/stop key 311 for instructing the release of register and the interruption of multicopying and a print key 312 for commanding the copy starting are disposed. On the right side face of the control panel 300, a joy ball 313 for selecting a copying mode menu, etc., a set key 314 for fixing the copying mode menu, etc. selected by the joy ball 313, a cancel key 315 for releasing the contents fixed by the set key 314 and a monitor key 316 for displaying the document image on a liquid-crystal display are provided adjacent to each other so as to be pressed while operating the joy ball 313. Furthermore, in the center of the control panel 300, a dot-matrix-type (640×400 dots) liquid-crystal display panel 222 for displaying every content related to the operation is installed.

Figure 3:
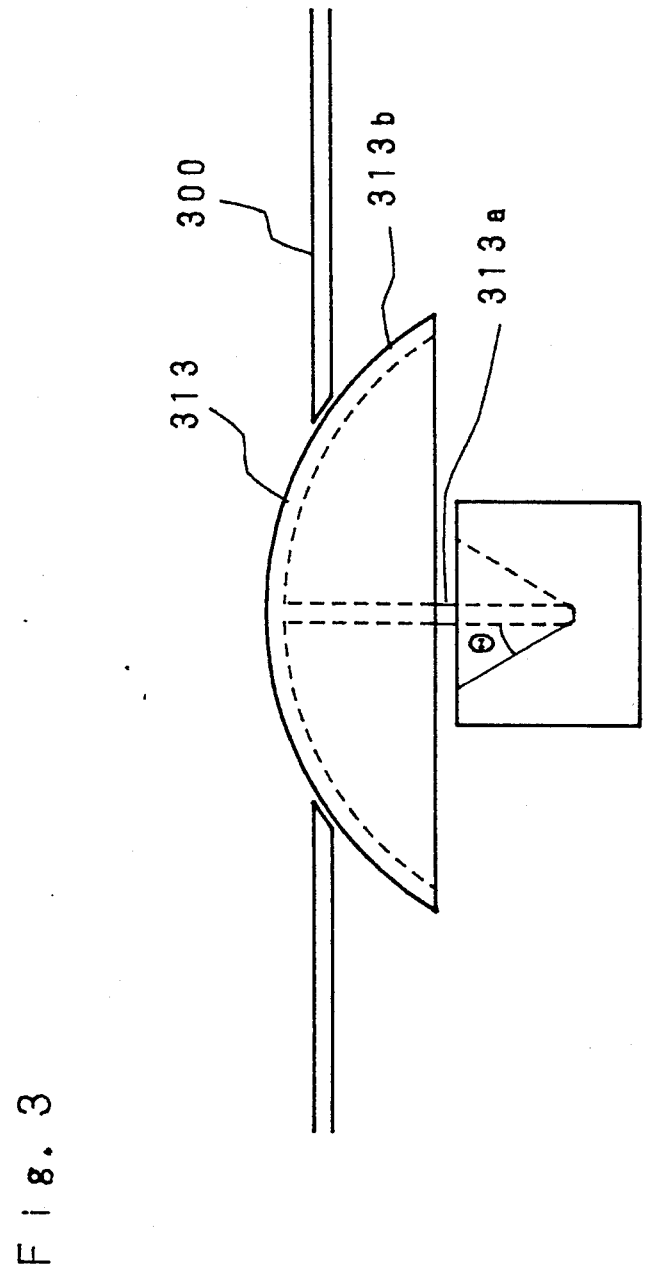
FIG. 3 is a schematic side view of a joy ball.
Figure 4:
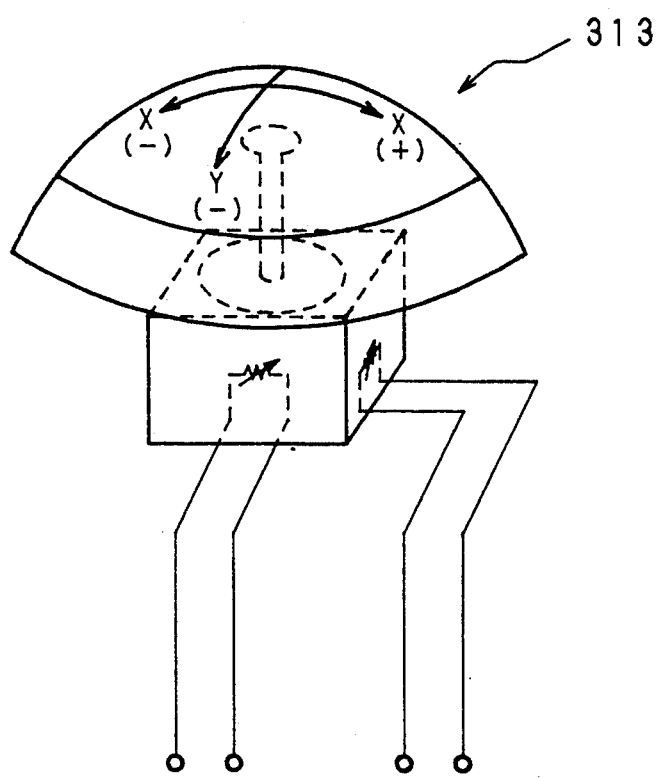
FIG. 4 is a perspective view of the joy ball.

FIG. 3 is a schematic side view of a vicinity of the joy ball 313, and FIG. 4 is a perspective view of the joy ball 313. The joy ball 313 comprises a stick 313a which can slant at a certain angle $\theta$ in all directions through angle 360°, and a ball 313b which constitutes a portion of a ball mounted on the upper portion of the stick 313a. A portion of the ball 313b is exposed from an exterior of the control panel 300, and when the joy ball 313 is rotated, the rest of the portion covered by the exterior of the control panel 300 is exposed. The stick 313a is designed to return and erect ($\theta=0$) automatically by means of a spring not shown. Rotation angles of the stick 313a in the directions X and Y are respectively detected by two variable resistors (refer to FIG. 4), converted into digital data by an A/D conversion I/O 218 to be described later and judged by a third CPU 203 to be described later for various controls.

Figure 5:
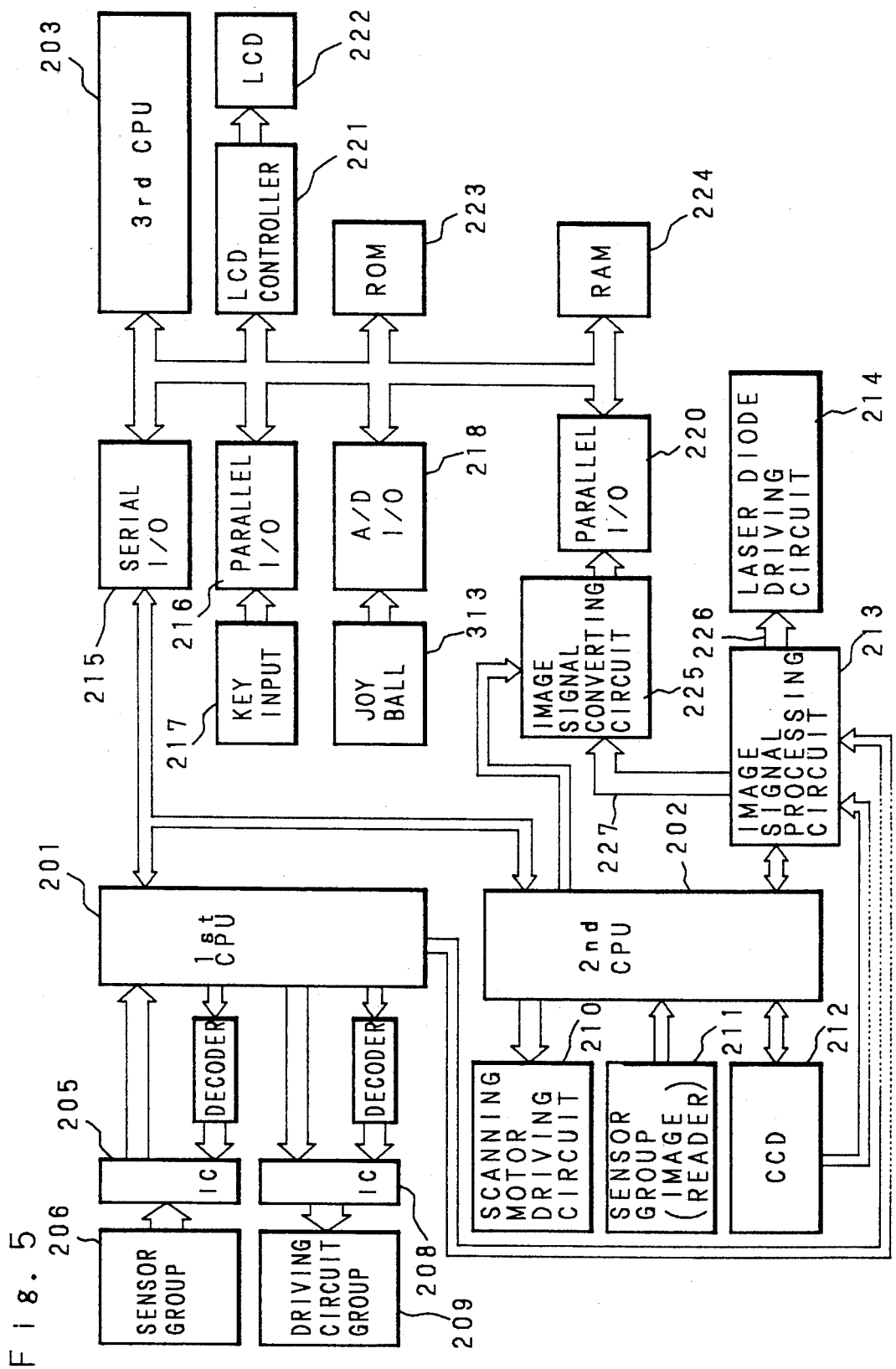
FIG. 5 is an entire control systematic diagram.

FIG. 5 is a systematic diagram of a control circuit of the present embodiment, in which a first CPU 201 controlling the engine 23, a second CPU 202 controlling the image reader 22 and a third CPU 203 controlling the control panel 300 are the core.

To the first CPU 201, signals from a group of sensors 206 disposed in several places of the engine 23 for detecting the operating conditions are inputted via an IC 205. Conversely, it outputs via an IC 208 control signals to a group of driving circuits 209 which drive various motors, solenoids and so on of the engine 23. Moreover, the first CPU 201 also outputs a control signal to an image signal processing circuit 213.

To the second CPU 202, signals from a group of sensors 211 which detect various conditions of the image reader 22 are inputted. The second CPU 202 controls a driving circuit 210 of the scanning motor 11, a peripheral circuit 212 of the CCD linear image sensor 14 and the image signal processing circuit 213. Image data from the CCD linear image sensor 14 is given to the image signal processing circuit 213, from which the image signal processed is given to a laser diode driving circuit 214 via a data bus 226.

To the third CPU 203, key inputs 217 of various keys of the control panel 300, except the joy ball 313, are given via a parallel I/O 216, while the condition of the joy ball 313 (information on the slanting direction and angle of the stick 313a) is inputted to the third CPU 203 via an A/D conversion I/O 218. The liquid-crystal display panel 222 is connected to the third CPU 203 via an LCD controller 221, and various displays are indicated on the liquid-crystal display panel 222 by selecting either of a binary of ON-OFF by each dot. The image signal processed by the image signal processing circuit 213 is inputted to an image signal converting circuit 225 via a data bus 227, and converted into a signal for the liquid crystal display in the image signal converting circuit 225, the converted signal being controlled by the third CPU 203 via a parallel I/O 220 and stored temporarily in a RAM 224. The converted signal is read out from the RAM 224 as required by controlling the third CPU 203, and displayed on the liquid-crystal display panel 222. The RAM 224 is also used for the working of control programs, and in a ROM 223, the control programs of the control panel 300 and the liquid-crystal display data are stored. The third CPU 203 is serially communicated with the first and second CPUs 201, 202 via a serial I/O 215.

Contents displayed on the liquid-crystal display panel 222 will be described.

Figure 6:
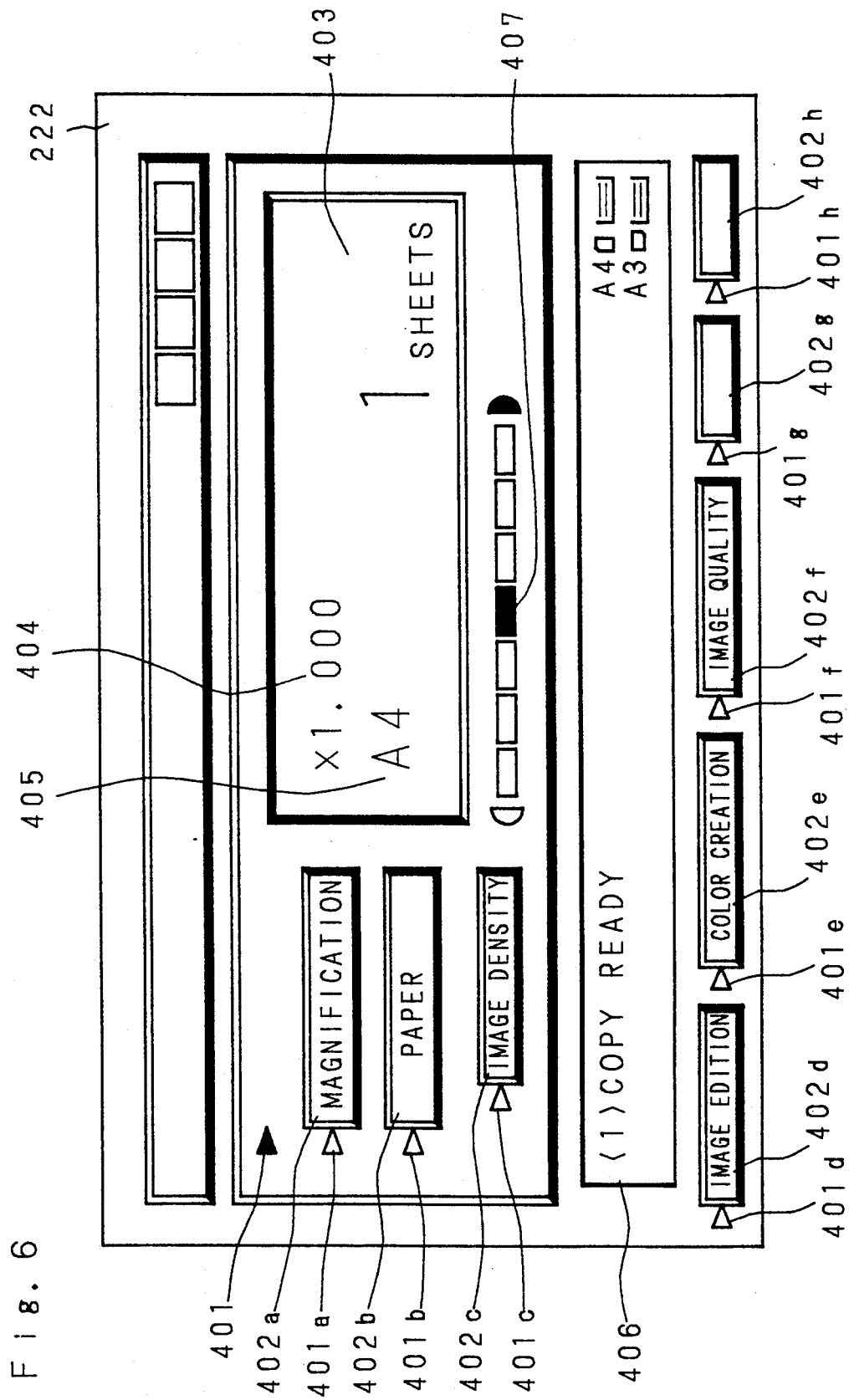
FIGS. 6~11 are schematic views showing the contents displayed on a liquid-crystal display panel.

FIG. 6 is a schematic view showing the displayed contents (hereinafter referred to as display $D_1$) of the liquid-crystal display panel 222 when a power supply is switched on. In the figure, numeral 401 indicates a home position of a menu cursor and 402a~402h indicate respective menus. At the left end of each menu, lighting positions 401a~401h of the menu cursor are provided, and when an arbitrary menu is selected by the operation of the joy ball 313, one of the lighting positions 401a~401h corresponding the selected menu is inverted in black. In FIG. 6, the menu cursor is shown at the home position. Numeral 403 in the figure denotes a copy quantity display which displays a copy quantity set by the ten-keys 301~310 such as the FIGS. 1~99. Numeral 404 indicates a copy magnification display which displays the magnification set by the function of the "magnification" menu 402a, and 405 is a copy paper size display which displays the paper size in the paper feed tray 50 selected by the function of the "paper" menu 402b. Also, 406 denotes an information display which displays the current condition of the copying apparatus or treatments to be conducted thereto by characters, picture words and the like, and 407 is a copy density level display which displays the copy density selected and set by the function of a "image density" menu 402c, the density level being classified into seven stages.

Figure 7:
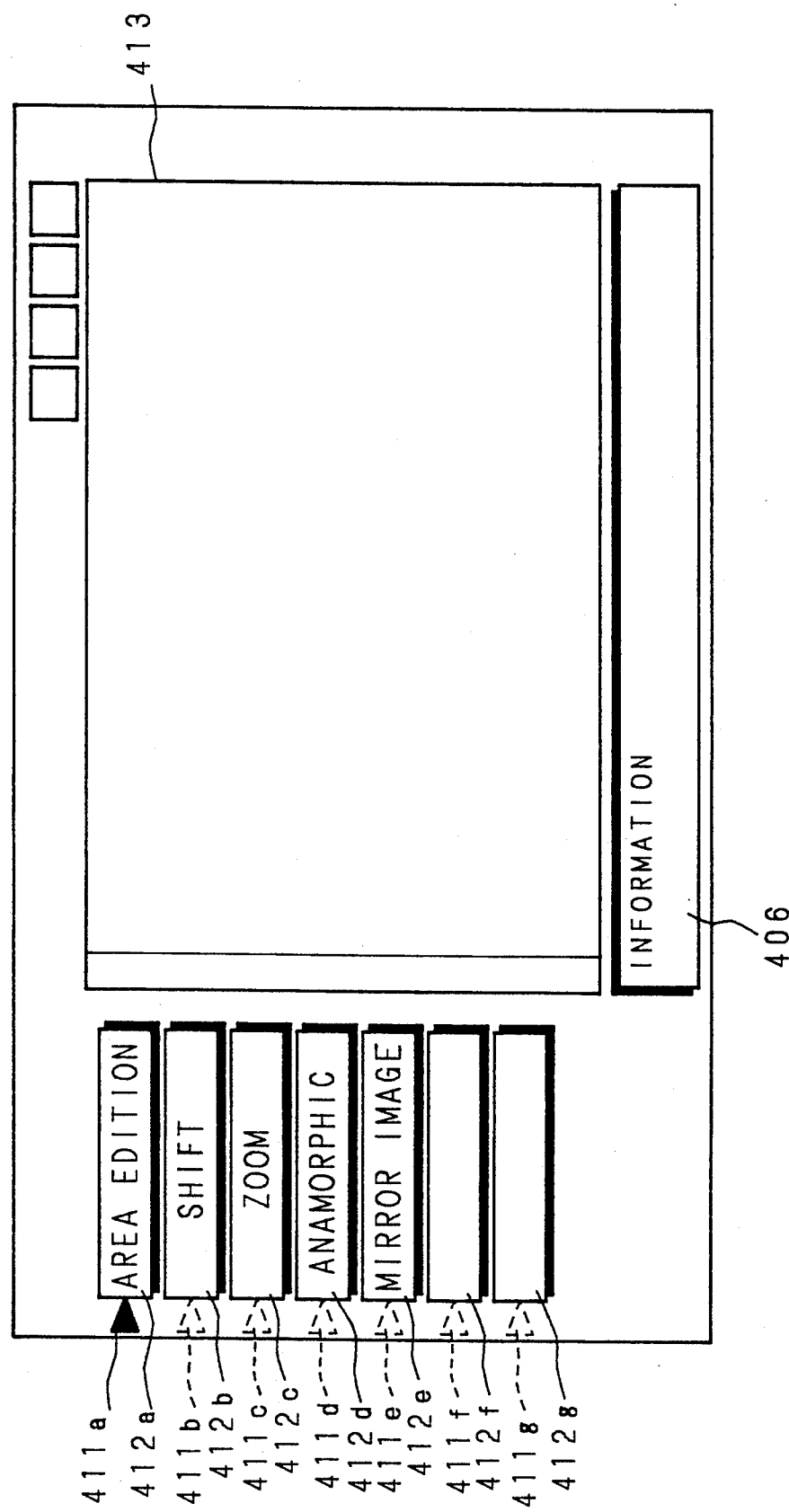

FIG. 7 is a schematic view showing the liquid-crystal display contents (hereinafter referred to as display $D_2$) when an image edition menu 402d is selected in the state shown in FIG. 6. Though the menu cursor is first located at the home position 401, when the joy ball 313 is rotated in the direction Y(−) (toward the front in FIG. 2), the menu cursor is moved in order of 401a→401b→401c→401d, and when the joy ball 313 is rotated in the direction Y(+), the menu cursor is moved in order of 401d→401c→401b→401a. When the joy ball 313 is rotated in the direction X(+) while the menu cursor is at 401d, it is moved in order of 401d→401e→401f→401g→401h, then if the joy ball 313 is rotated in the direction X(−), the menu cursor is moved in order of 401h→401g→401f→401e→401d.

If the set key 314 is turned on when the menu cursor is at 401a, it is instructed to set the magnification. At this time, the copy magnification is set by pressing on the set key 314 after setting it by the ten-keys 301~310. The joy ball 313 may also be used to set the magnification. That is, when the joy ball 313 is rotated in the direction Y, a magnification set value increases or decreases at every 0.001 unit, so that the magnification is set by pressing on the set key 314 at a time point showing the desired magnification. A scanning speed of the scanner 10 is 1/M when the equimagnification is 1 and the magnification is set at M, therefore, as to a scanning direction of the scanner 10, the magnification is changed optically. Meanwhile, with respect to a direction perpendicular to the scanning direction (a direction parallel to each receptive element of the CCD linear image sensor 14), the image read by the image signal processing circuit 213 is processed for scale-down and scale-up.

If the set key 314 is turned on when the menu cursor is at 401b, it is instructed to select either the upper or lower paper feed tray 50. At this time, the paper sizes in the upper and lower paper feed trays 50 are also displayed by a paper size detecting device to be described later, and the paper feed tray 50 is selected by rotating the joy ball 313, completing the paper size setting by turning on the set key 314. Meanwhile, a screen shown in FIG. 7 is obtained if the set key 314 is turned on when the menu cursor reaches the position 401d. In the screen, besides respective menus 412a~412g, lighting positions 411a~411g corresponding to respective menus and the information display 406, an image monitor area 413 whereon the document image read by the image reader 22 is displayed roughly can be observed.

Figure 8:
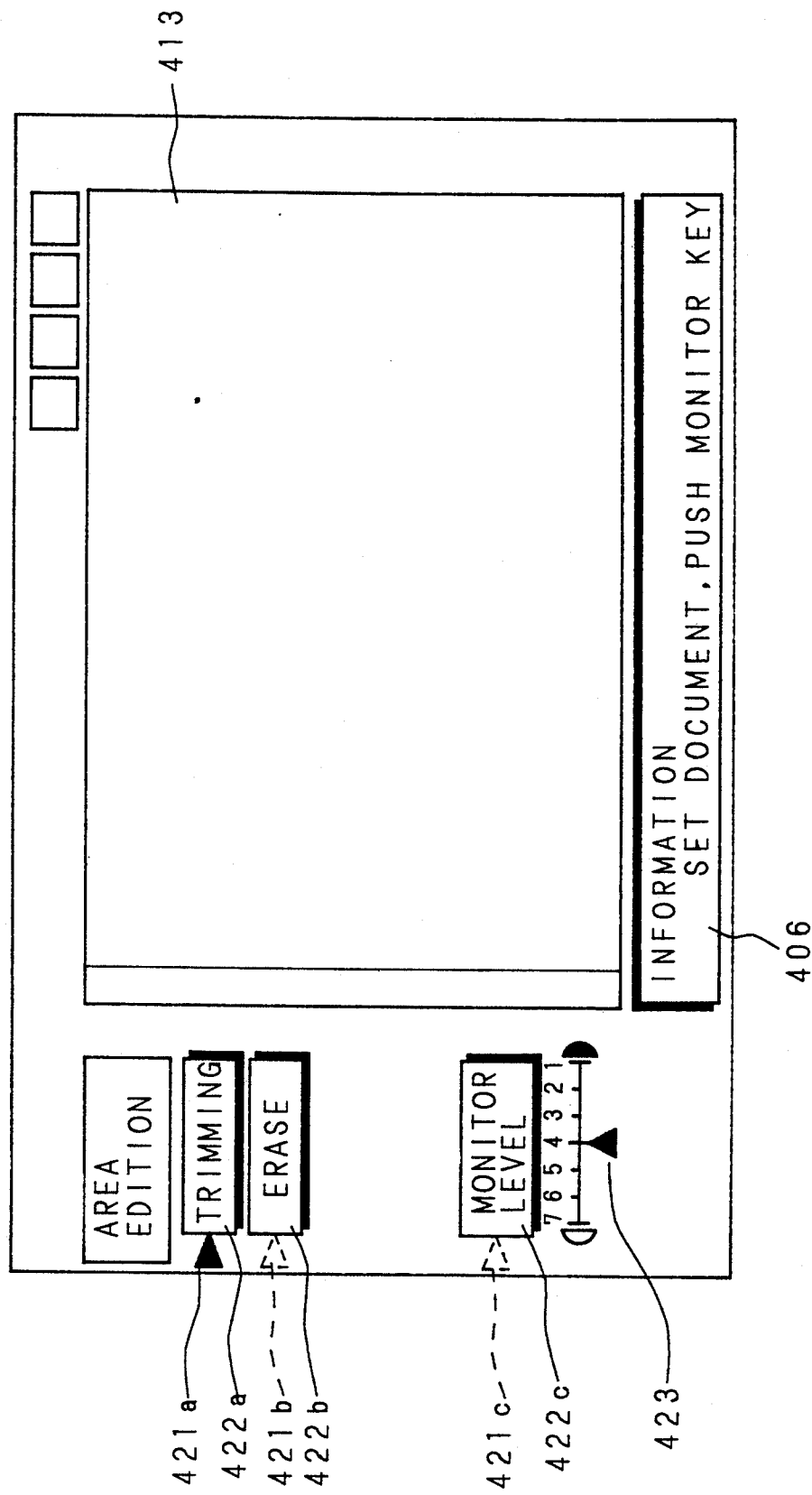

FIG. 8 is a schematic view showing the displayed contents (hereinafter referred to as display $D_3$) when the area edition menu 412a is selected in the state shown in FIG. 7, in which when the joy ball 313 is rotated to move the menu cursor to 411a, and the set key 314 is turned on, a screen shown in FIG. 8 appears. In the screen, three kinds of menus 422a~422c are shown. Here, the menu 422c of the "monitor level" is for changing comparison data which is a threshold when converting to display data from the document image data in the image monitor display. A density rate of the comparison data is shown in seven stages in the monitor level display 423.

Figure 9:
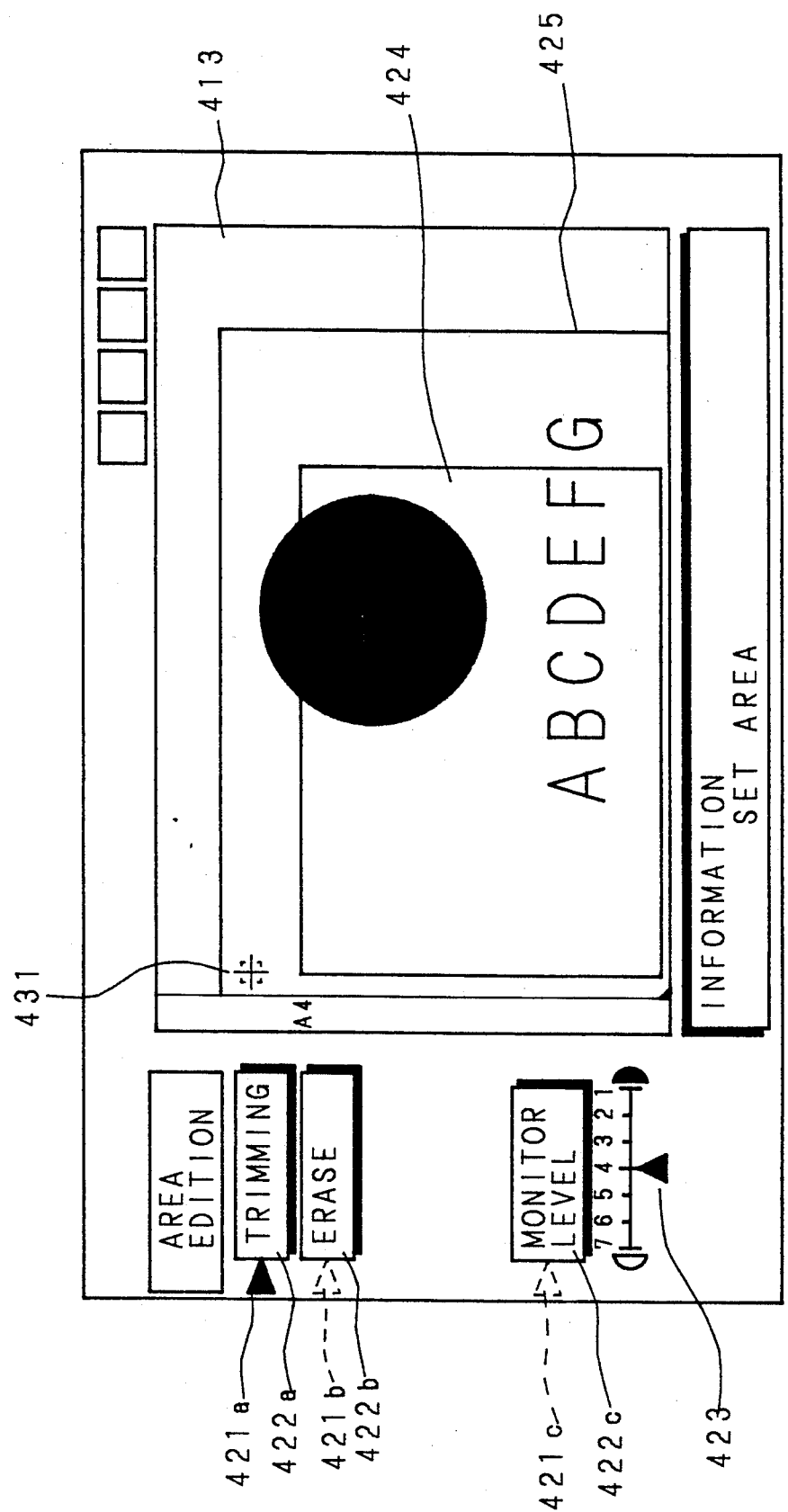

FIG. 9 is a schematic view showing the displayed contents (hereinafter referred to as $D_4$) when the image monitor display is finished in accordance with the information display in the state shown in FIG. 8. In the figure, when the document is set on the original glass plate 15 and the monitor key 316 is turned on responsive to the information display, the document is scanned by the scanner 10 and the document image is displayed in the image monitor area 413 when the scanning is completed. When the trimming menu 422a is selected while the document image is displayed, a position select cursor 431 appears in the image monitor area 413. At this time, in the image monitor area 413, an effective image area frame 424 indicating an area to be copied actually in response to the paper size selected, and a document frame 425 indicating the document edges are displayed together with the document image.

Figure 10:
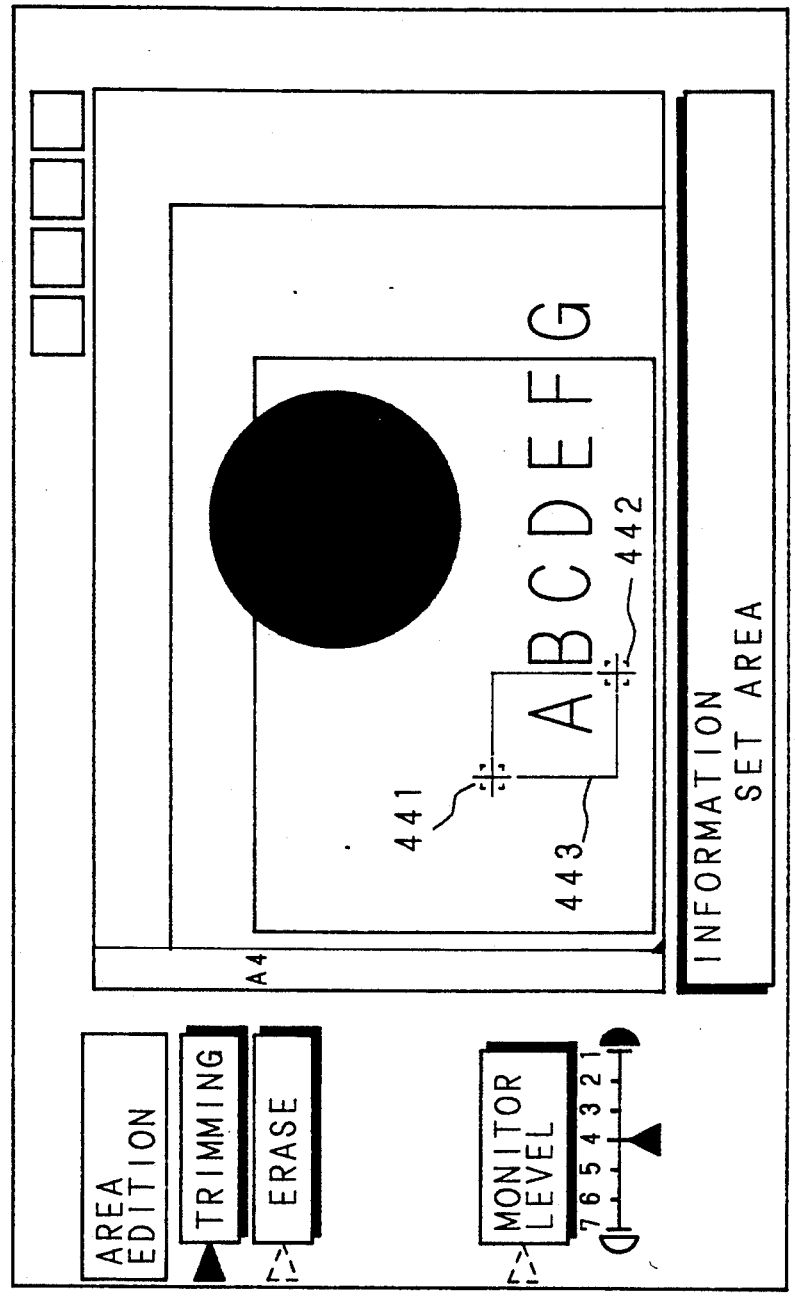

FIG. 10 is a schematic view showing the displayed contents (hereinafter referred to as display $D_5$) in the case wherein area setting of the trimming mode is actually conducted in the state shown in FIG. 9. When the joy ball 313 is rotated to move the position appoint cursor 431 from a position shown in FIG. 9 to a setting position 441 shown in FIG. 10, and the set key 314 is turned on, the position appoint cursor 431 is fixed and displayed at the position 441. When the joy ball 313 is further rotated to move the position appoint cursor 431 from the position 441 to a position 442, and the set key 314 is turned on, the position appoint cursor 431 is fixed and displayed at the position 442. A quadrangle 443 having two points displayed and fixed in such a way as opposite ends of a diagonal thereof is designated as a trimming set area.

Figure 11:
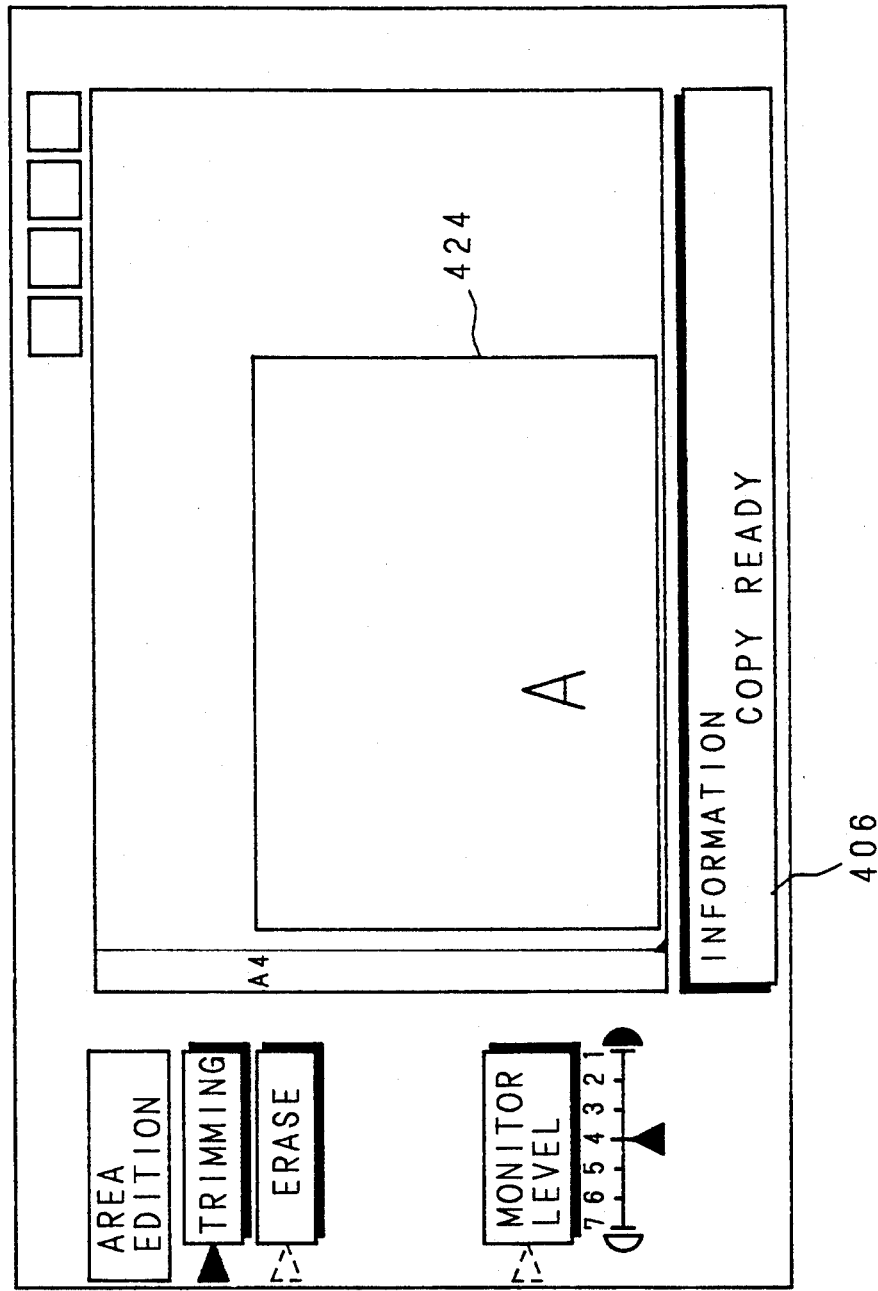

FIG. 11 is a schematic view showing the displayed contents (hereinafter referred to as display $D_6$) when the set key 314 is turned on after the position of the second point is set in the state shown in FIG. 10. When the set key 314 is turned on after setting the trimming area, the image (M) in the set area is remained and the rest is erased. At this time, the effective image area frame 424 is remained displayed so that whether the remained image can be copied is judged easily. Now the area setting in the trimming mode is completed, so that "COPY READY" is displayed on the information display 406.

Procedures for setting the other area by the trimming mode after setting one area thereby will be described together with the displayed contents on the liquid-crystal display panel 222 on the occasion.

After setting one area (display $D_6$ shown in FIG. 11), first the set key 314 is turned on to display the document original image in the image monitor area 413 again as shown in FIG. 9 (display $D_4$). Then, at this time, the position appoint cursor 431 appears at the second position 442 in the previous area setting (refer to FIG. 10), and the quadrangle 443 indicating the previous set area appears, "SET AREA" being displayed on the information display 406. Then, exactly in the same way as the previous first area setting, the joy ball 313 is rotated to move the position appoint cursor 431 to a desired position, and the set key 314 is turned on to appoint the first point of a new set area. Next, the second point of the new set area is appointed in the same way. Then, in the image monitor area 413, while the document image in the previous and new set areas being remained, the rest of the image is erased, and "COPY READY" is displayed on the information display 406.

By repeating such operations, the third, fourth . . . area can be set.

Procedures for setting an erase area in the set area in the trimming mode will be described together with the displayed contents on the liquid-crystal display panel 222 on the occasion.

First, the joy ball 313 is rotated in the direction Y(−) to move the menu cursor 421a so as to light 421b, then the set key 314 is turned on to change to the erase mode from the trimming mode. Next, exactly in the same way as the area setting of the trimming mode, an erase mode area is set.

Figure 12:
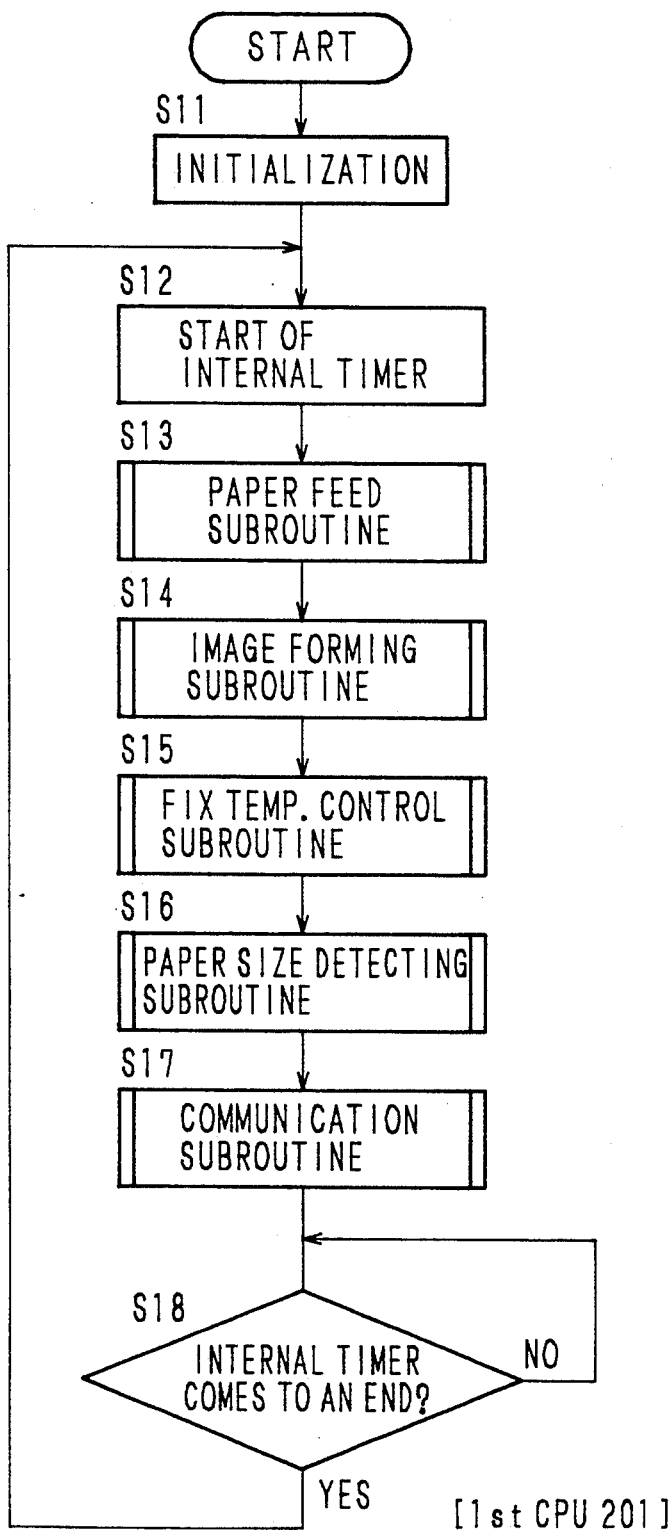
FIG. 12 is a flow chart showing a main routine of a first CPU 201.

FIG. 12 is a flow chart showing a main routine of the first CPU 201 which controls the engine portion 23. First, when a power is switched on, in Step S11, various timers, flags, counters and so on which are to be used in the subsequent subroutines are initialized, thereafter an internal timer value which serves as a reference time of the following processings is set to start (Step S12).

Then, the processings continue as follows, transportation of the copy paper is controlled (Step S13), charging, developing in the vicinity of the photosensitive drum 41 are controlled (Step S14), temperature of the fixing unit 48 is controlled (Step S15), a paper size in the paper feed tray 50 is detected (Step S16), serial communications with the second and third CPUs 202, 203 are conducted (Step S17), and the procedure is returned to Step S12 after the end of the internal timer to restart it (Step S18).

Figure 13:
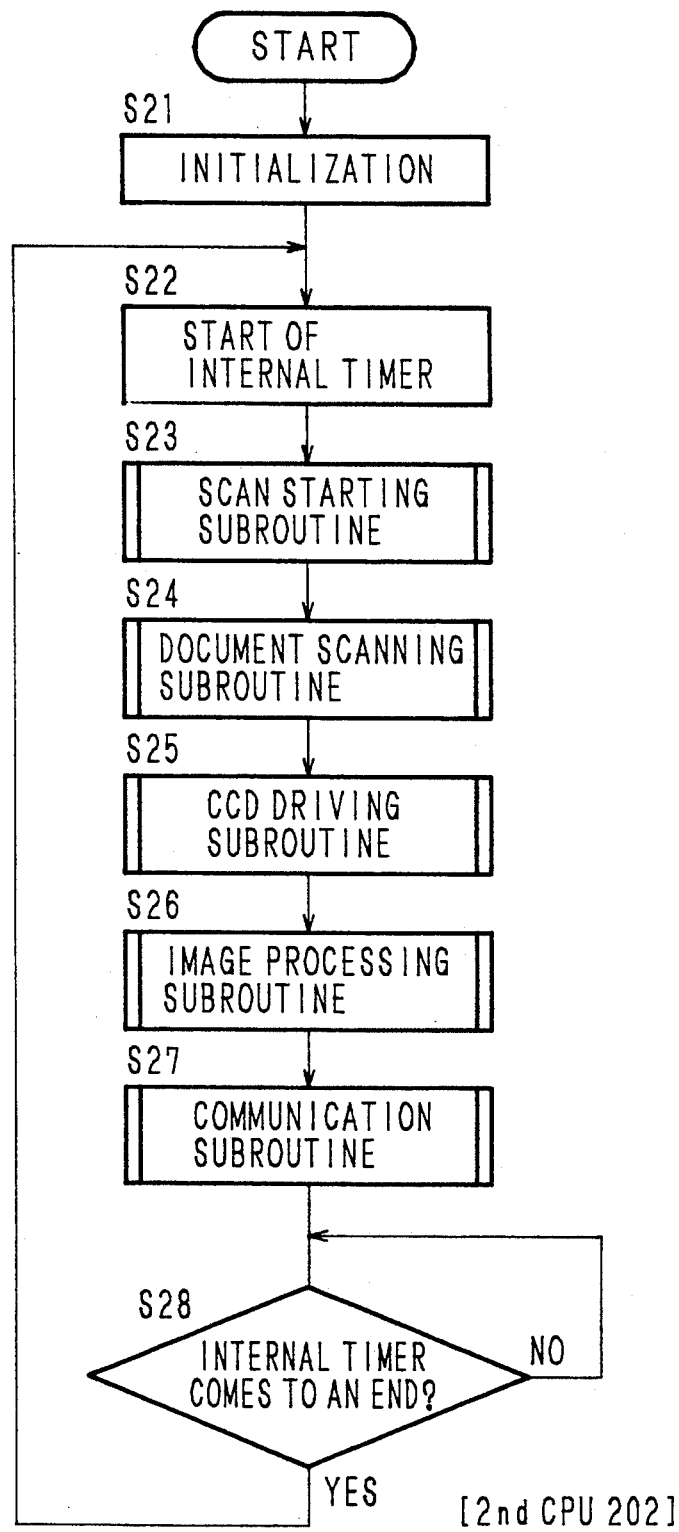
FIG. 13 is a flow chart showing a main routine of a second CPU 202.

FIG. 13 is a flow chart showing a main routine of the second CPU 202 which controls the image reader 22. First, when a power is switched on, after initializing various timers, flags, counters and so on which are to be used in the subsequent subroutines in Step S21, an internal timer value which serves as a reference time of the following processings is set to start (Step S22). Then, start of scanning is controlled in response to the instruction from the third CPU 203 (Step S23), and a speed and position of the scanning motor 11 are controlled so as to scan a document in agreement with timing signals from the other CPUs (Step S24). In synchronism with the scanning operation, the CCD peripheral circuit 212 is controlled and the color CCD linear image sensor 14 is driven to obtain an image signal (Step S25). Various processings such as changing magnifications are conducted on the image signal thus obtained (Step S26), a serial communication with the first CPU 201 is executed (Step S27), and the procedure is returned to Step S22 after the end of the internal timer to restart it (Step S28).

Figure 14:
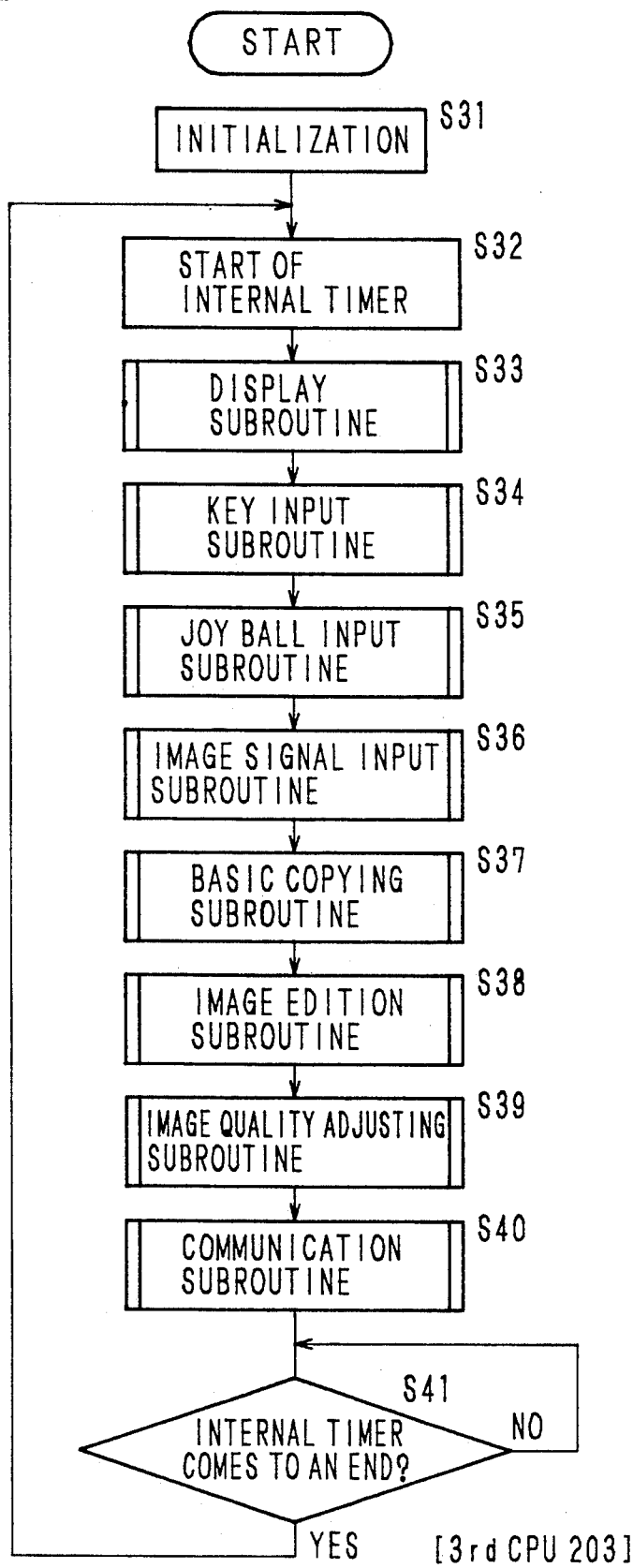
FIG. 14 is a flow chart showing a main routine of a third CPU 203.

FIG. 14 is a flow chart showing a main routine of the third CPU 203 which controls the control panel 300. First, when a power is switched on, after initializing various timers, flags, counters and so on which are to be used in the subsequent subroutines in Step S31, an internal timer value which serves as a reference time of the following processings is set to start (Step S32). Then, by providing display image data and commands to the LCD controller 221, the liquid-crystal display panel 222 is displayed (Step S33). Then, ON/OFF states of various keys 301∼312, 314∼316 on the control panel 300 are judged and the contents of the judgement are stored in the RAM 224 via the parallel I/O 216 (Step S34). Moreover, the rotating state of the joy ball 313 is judged and the content thereof is stored in the RAM 224 via the A/D conversion I/O 218 and a flag to be described later is produced (Step S35). The image signal converted in the image signal conversion circuit 225 is stored in the RAM 224 via the parallel I/O 220 (Step S36). Thereafter, the processings continue as follows, various processings in a basic copying mode are conducted in response to input processings in Steps S34, S35 (Step S37), various processings in an image edition and copying mode are executed in response to input processings in Steps S34, S35, S36 (Step S38), various processings in an image quality adjusting state are performed in response to input processings in Steps S34, S35 (Step S39), serial communications with the first and second CPUs 201, 202 are conducted (Step S40), and the procedure is returned to Step S32 after the end of the internal timer to restart it (Step S41).

Figure 15:
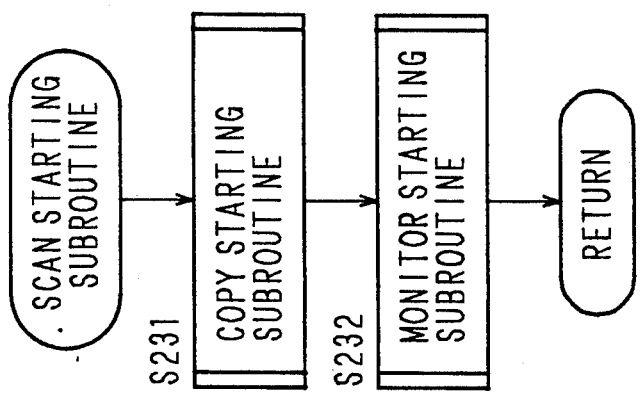
FIGS. 15, 16, 23, 25, 26, 29~34, and 38 are flow charts showing subroutines of the main routines.

FIG. 15 is a flow chart showing the contents of a scan starting routine in Step S23 of FIG. 13. The processings are divided into the scanning start for the actual copying operation (Step S231) and the scanning start for the document image monitor (Step S232). In Step S231, it is so arranged that the actual copying operation is cancelled at monitor request.

Figure 16:
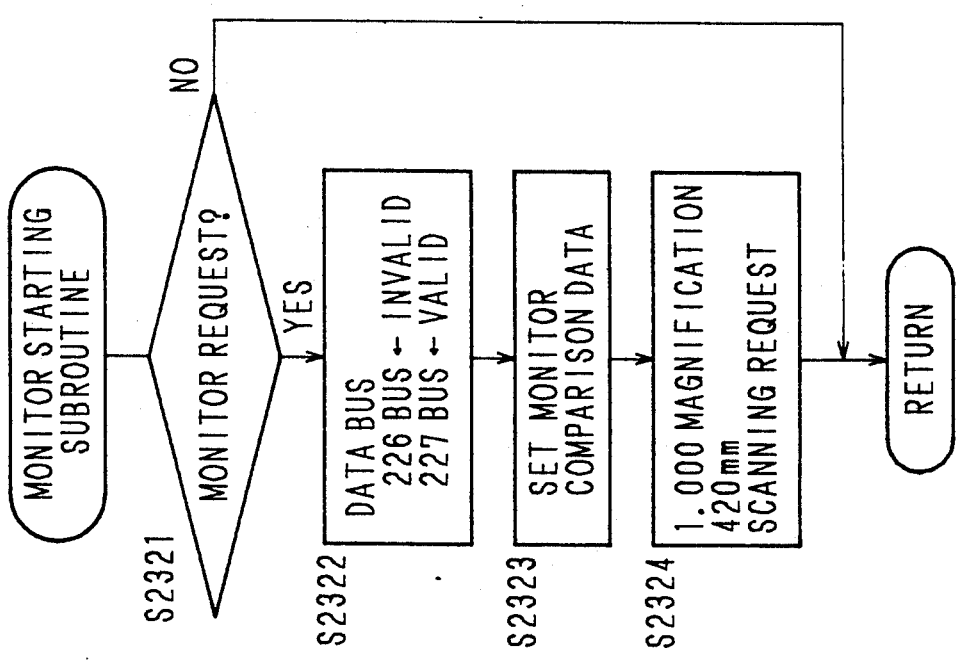

FIG. 16 is a flow chart showing the contents of a monitor starting routine in Step S232 of FIG. 15. The monitor request from the third CPU 203 is transmitted to the second CPU 202 by a serial communication, and after receiving the request (Step S2321 YES), a data bus 226 is made invalid and a data bus 227 is made valid (Step S2322). That is, at this time, the image signal obtained by the color CCD image sensor 14 when the document is scanned, is sent to the image signal conversion circuit 225 after processed in the image signal processing circuit 213. Then, after setting monitor comparison data to be described later (Step S2323), the scanning request of the document at 1.000 magnification and 420 mm (A3 length) scanning length is made (Step S2324).

Subsequently, in Step S24 (refer to FIG. 13), the scanning motor 11 is driven in response to the magnification and scanning length for document scanning, and the image signal is stored in the RAM 224 via the parallel I/O 220 after being converted in the image signal conversion circuit 225. The document size (position) is detected on the basis of the image signal obtained by the scanning.

Figure 17A:
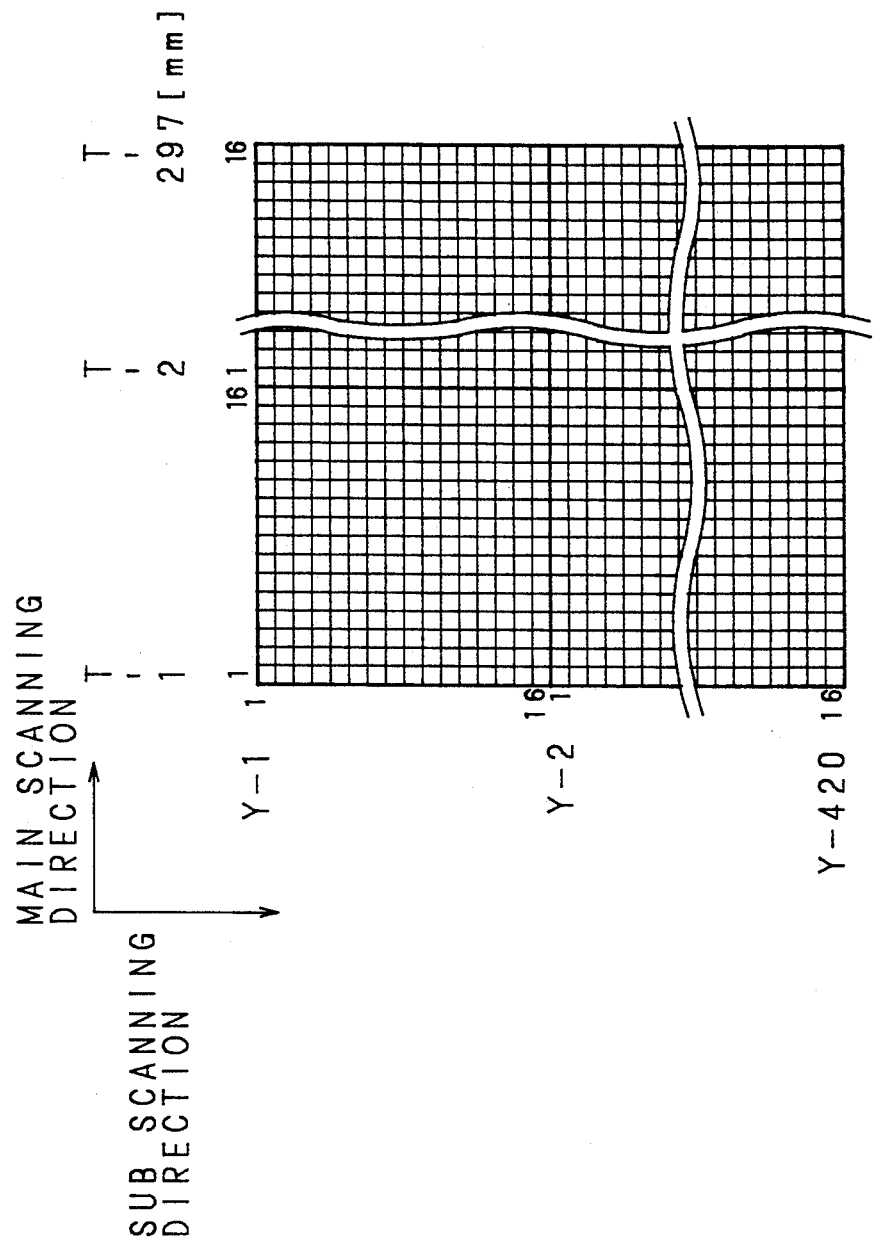
FIGS. 17 and 18 are schematic views for illustrating the operating contents of an image signal conversion circuit.
Figure 18:
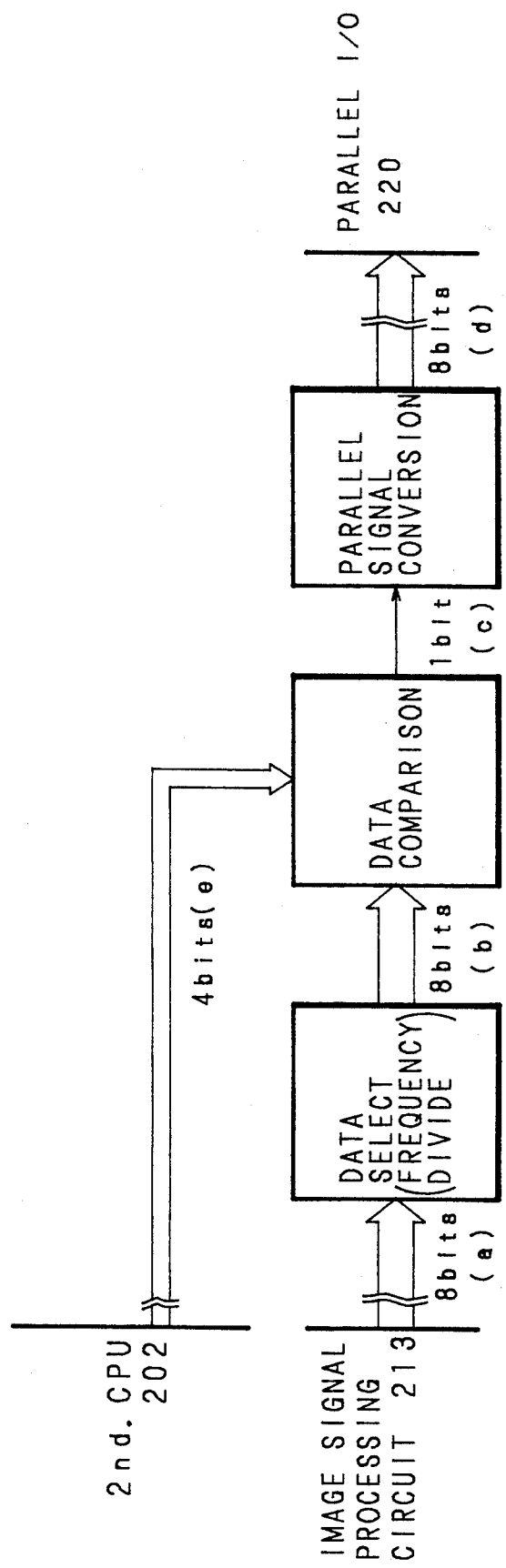

FIGS. 17 and 18 are schematic views for explaining the operating contents of the image signal conversion circuit 225. Relative to the reading of the CCD linear image sensor 14 made in 8 bits (gradation) per dot at a resolution of 16 dots/mm, in the display on the liquid-crystal display panel 222, 1 mm of a document is corresponded to 1 dot liquid crystal so as to be displayed by a binary of ON-OFF at a resolution of 1 dot/mm, therefore the image signal is converted in the image signal conversion circuit 225. FIG. 17(a) shows an image reading signal and FIG. 17(b) shows an image displaying signal. Though the image signal of 8 bits in every 1/16 mm square is obtained at reading, a signal used for display is the signal of only one time (8 bits) in every 1 mm square.

In FIG. 18, first, in the image signal conversion circuit 225, an image signal (b) of 8 bits required is selectively extracted by a hexadecimal frequency division of an image signal (a) of 8 bits from the image signal processing circuit 213. The high-ranking 4 bits of the image signal (b) of 8 bits and 4 bits monitor comparison data (e) instructed from the second CPU 202 are compared and the result is outputted in 1 bit data (c). The 1 bit data (c) is outputted as "1" when the high-ranking 4 bits of the image signal (b) is larger than the monitor comparison data (e), and as "0" when the former is same as or smaller than the latter. When "1" is outputted, a liquid crystal comes on, and when "0" is outputted, it goes off. For example, if (a)=10010011 in the image signal (a) by a binary notation, when SL (comparison data)=8=1000 (binary notation), "1" is outputted and the liquid crystal will come on, but when SL=10=1010 (binary notation), "0" is outputted and the liquid crystal will go off.

Meanwhile, the 1 bit data (c) is recorded in order in 8 bits parallel data (d), which is outputted to and stored in the RAM 224 via the parallel I/O 220. For example, in the case of A3 length of 297 mm×420 mm, the sequence of output is in order of (T-1, Y-1)→(T-2, Y-1)→ ... →(T-297, Y-1)→(T-1, Y-2)→ ... →(T-297, Y-420), and the image data of 297×420=124.74 (k bits) are stored in the RAM 224. The 4 bits comparison data (e) instructed from the second CPU 202 is the data indicating a threshold level of a display density, and since this data is variable by the joy ball input on the control panel 300 as to be described later, the monitor image can be adjusted to any density desired.

Figure 19:
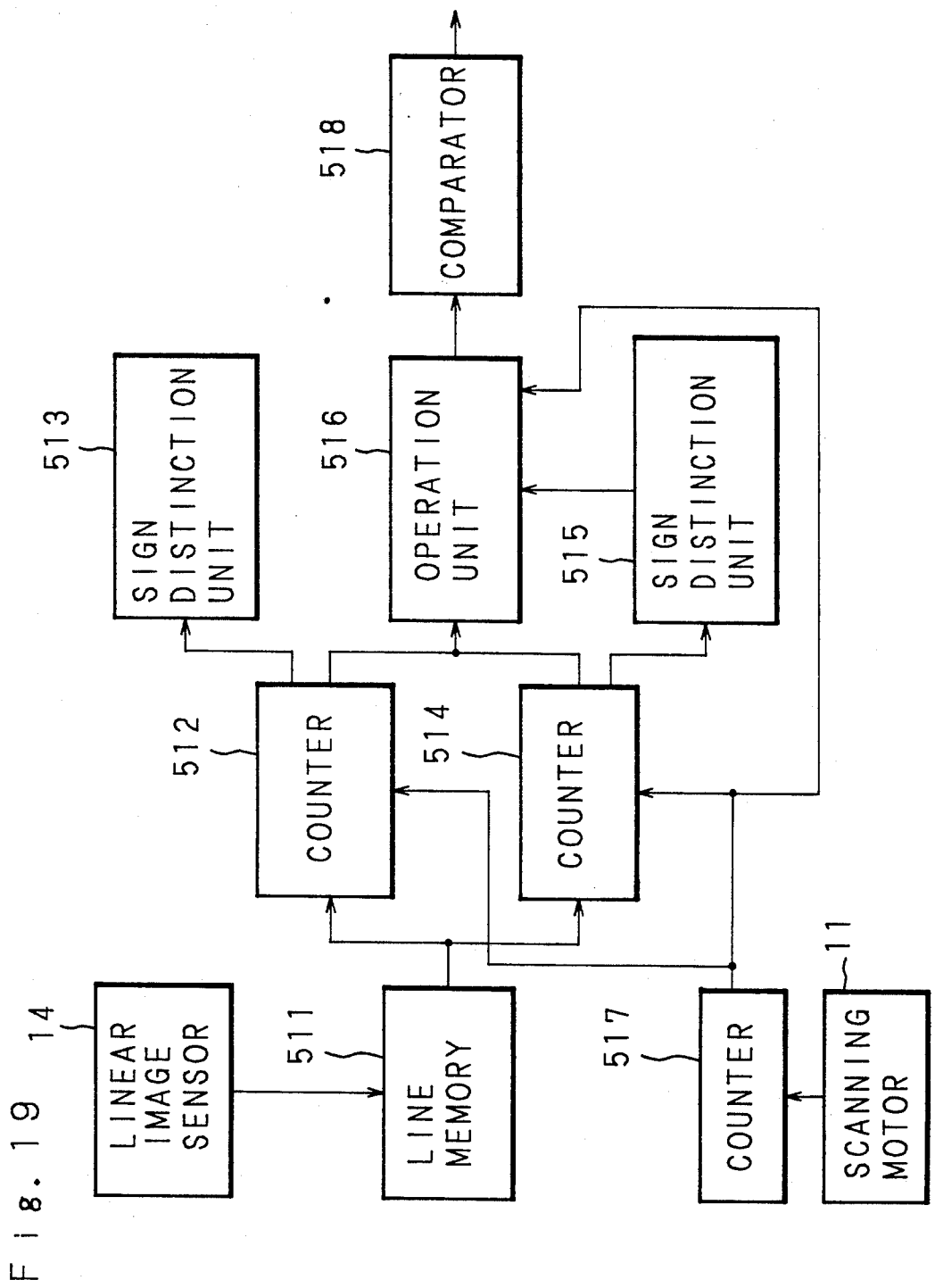
FIG. 19 is a block diagram showing the configuration for detecting a document size.
Figure 20:
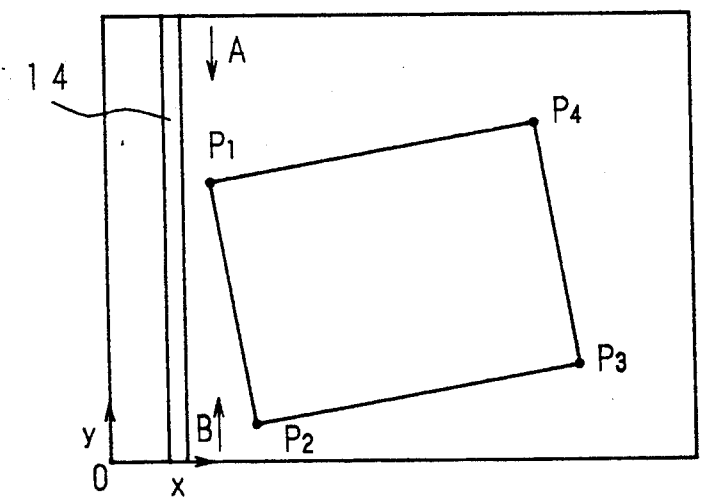
FIG. 20 is a schematic view for explaining the principle of detecting a document size.

Next, detection of a document size (position) will be described. FIG. 19 is a block diagram showing a systematic configuration for detecting the document size, and FIG. 20 is a schematic view for explaining the principle. In FIG. 19, numeral 14 indicates a CCD linear image sensor, and in FIG. 20, a horizontal direction (direction x) is a scanning direction of a CCD scanner 10 (linear image sensor 14), and a vertical direction (direction y) is a direction parallel to each receptive element disposed in the CCD linear image sensor 14.

Depending upon whether a document read by the CCD linear image sensor 14 is placed, the white/black result of each picture element which is binary-coded by a predetermined threshold value is stored in a predetermined address of a line memory 511. For the data for one line stored in the line memory 511, a counter 512 counts the number of black picture elements in order from the high-ranking address (direction A in FIG. 20) till the presence of white picture elements, and stops counting when the white picture elements are found. Similarly, for the data for one line, a counter 514 counts the black picture elements in order from the low-ranking address (direction B in FIG. 20) till the presence of white picture elements, and stops counting when the white picture elements are found. The counters 512, 514 can count till a predetermined value (all picture elements for one line) beforehand, and when detecting by the signal from the scanning motor 11 the timing whereat the scanning of the CCD linear image sensor 14 has advanced one step in the direction x, outputs respective count values to the corresponding sign distinction units 513, 515 and an operation unit 516.

The sign distinction units 513, 515 distinguish a sign of a count value difference of the adjoining lines (count value of a new line-count value of a previous line), and output the distinction result to the operation unit 516, which is also inputted the count values from the counters 512, 514. Numeral 517 denotes a counter which counts a position address in the direction x of the CCD linear image sensor 14 by the signal from the scanning motor 11. The counter 517 outputs the count value to the operation unit 516. In agreement with the increment of the counter 517, the counters 512, 514 are reset and start counting for the next line.

The operation unit 516 obtains positions (coordinates) of four vertexes of the document on the basis of said distinction result and count values from the counters 512, 514, 517, then calculates the length of four sides thereof and outputs the calculation result to a comparator 518. In the comparator 518, there is stored a regular copy paper size which is compared with the calculation result to detect the document size (position).

Next, the operation of detecting the document size (position) will be specifically described on the basis of an example wherein a document (four vertexes $P_1$, $P_2$, $P_3$, $P_4$) is placed as shown in FIG. 20. As shown in the figure, x, y coordinate system is set and coordinates of respective vertexes are plotted at $P_1$ ($x_1$, $y_1$), $P_2$ ($x_2$, $y_2$), $P_3$ ($x_3$, $y_3$) and $P_4$ ($x_4$, $y_4$). While scanning the CCD linear image sensor 14 one line at a time in order rightward from the position x=0, picture elements (black) outside the document are counted from both the directions A and B at every line scanning until white picture elements are reached. If the count values of the counters 512, 514 are $A(x_i)$ and $B(x_i)$ respectively when the x-coordinate of the CCD linear image sensor 14 is $x_i$, from the values $x_i$, $A(x_i)$ and $B(x_i)$, the coordinates of the four vertexes $P_1$, $P_2$, $P_3$, $P_4$ are detected.

In the beginning of the scanning (until $P_1$ is reached), since there is no document placed in the area, the count values of the counters 512, 514 are the number of all picture elements for one line, but when $P_1$ is reached, the count values of the counters 512, 514 become less than the predetermined value (all picture elements for one line) for the first time. The sign distinction units 513, 515 respectively calculate the values $A(x_i+1)-A(x_i)$, $B(x_i+1)-B(x_i)$, so that it can be judged that $P_1$ is reached because the value of $A(x_i+1)-A(x_i)$ takes the value other than 0. And the position of $P_1$ is known by the count value (x-coordinate) from the counter 517 and the count value (y-coordinate) from the counter 514 at this time. For P₂, it can be obtained by checking a sign of $B(x_i+1)-B(x_i)$. The difference is minus until P₂ is reached, but it becomes plus when P₂ is passed. Accordingly, by the count values of the counters 514, 517 at a time point when the difference turns into plus from minus, the position of P₂ is detected.

Next, by the count values of the counters 514, 517 at a time point when a sign of $A(x_i+1)-A(x_i)$ changes to plus from minus, the position of P₄ can be detected. Finally, by the count values of the counters 514, 517 at a time point when they returned to the predetermined values, the position of P₃ can be detected.

The lengths of four sides of the document are detected by the operation unit 516 using the coordinates of the four vertexes obtained in such a manner. First, $\overline{P_1P_2}$ is calculated according to the following formula (1), and the lengths of the other three sides are calculated by the same calculating equation as the formula (1).

$$\overline{P_1P_2} = \sqrt{(x_2-x_1)^2 + (y_2-y_1)^2} \quad (1)$$

Lastly, the lengths of the four sides thus calculated and a regular copy paper size are compared by the comparator 518 to detect the document size. A block diagram shown in FIG. 19 is a portion of the image signal processing circuit 213 shown in FIG. 5, and an output of the comparator 518 is transmitted to the third CPU 203 via the second CPU 202 and the serial I/O 215.

Figure 21:
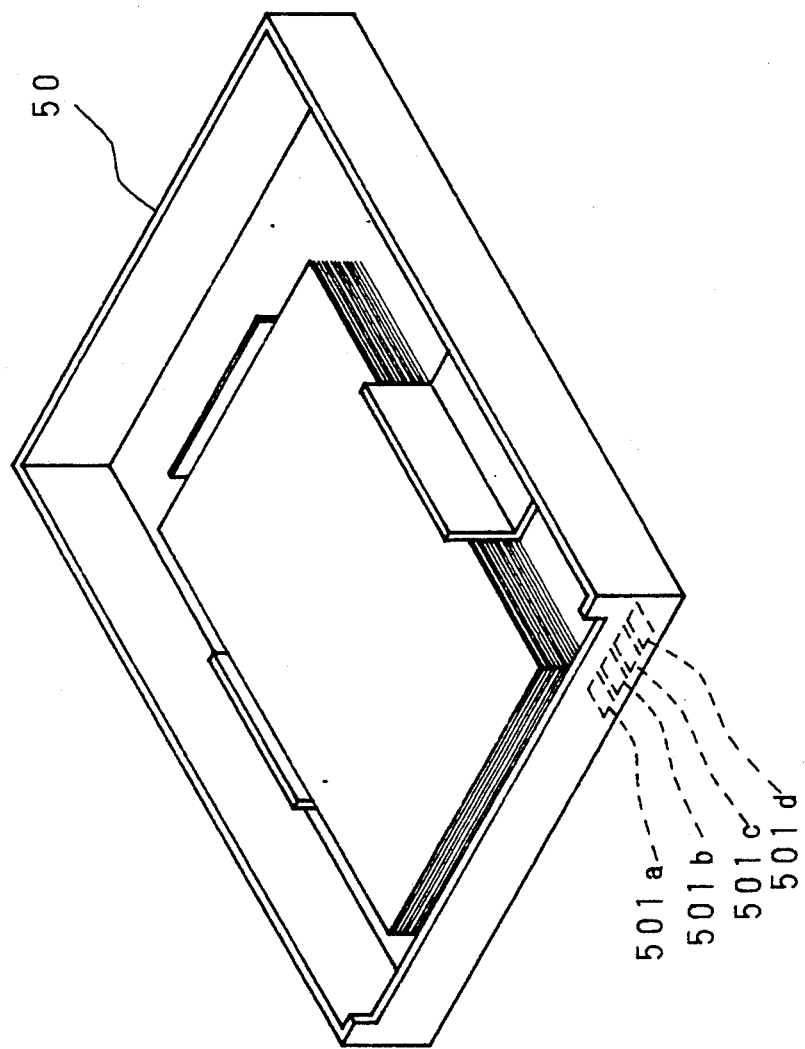
FIG. 21 is a perspective view of a paper feed tray.
Figure 23:
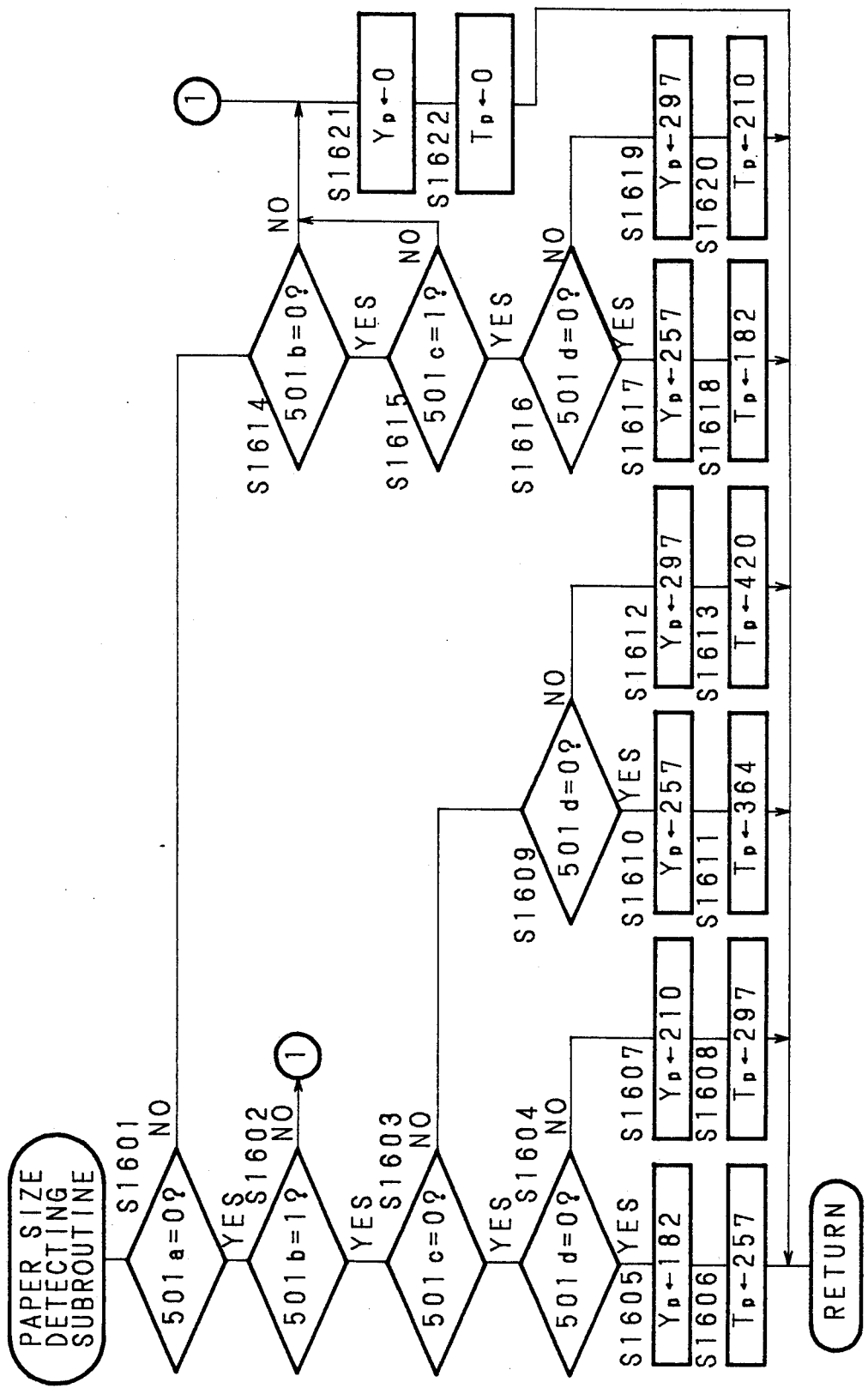

FIG. 21 is a perspective view of the paper feed tray 50, FIG. 22 is a table showing the relationship between the paper size and direction and the magnet attached position, and FIG. 23 is a flow chart showing the contents of a paper size detecting routine shown in FIG. 12. As shown in FIG. 21, the paper feed tray 50 is provided with four magnets 501a~501d on its bottom, and when it is installed on a copying apparatus, attached states of the magnets are detected by a lead switch (not shown). The size and position of the paper contained in the paper feed tray 50 are detected by the relationship shown in FIG. 22 responsive to the detected result. The lead switch is a sensor included in a group of sensors 206 (refer to FIG. 5).

The attached state of the four magnets 501a~501d is judged (Steps S1601, S1602, S1603, S1604, S1609, S1614, S1615, S1616), and responsive to the results, the lateral paper lengths are set to $Y_p$ in mm, and the longitudinal paper lengths are set to $T_p$ in mm respectively (Steps S1605, S1606, S1607, S1608, S1610, S1611, S1612, S1613, S1617, S1618, S1619, S1620, S1621, S1622). By such processings conducted on the upper and lower paper feed trays 50 installed in two steps, $T_{p1}$, $Y_{p1}$ data in the upper tray and $T_{p2}$, $Y_{p2}$ data in the lower tray can be obtained. The results thus obtained are used for paper transfer, image forming and the other routines in the first CPU 201 itself, and sent to the second and third CPUs 202, 203 through a serial communication so as to be used as a judging factor for determining the scanning length in the former and as various displaying conditions in the latter.

In the following, the image monitor display and displays of the effective image area frame 424 and the document frame 425 will be described.

Figure 24:
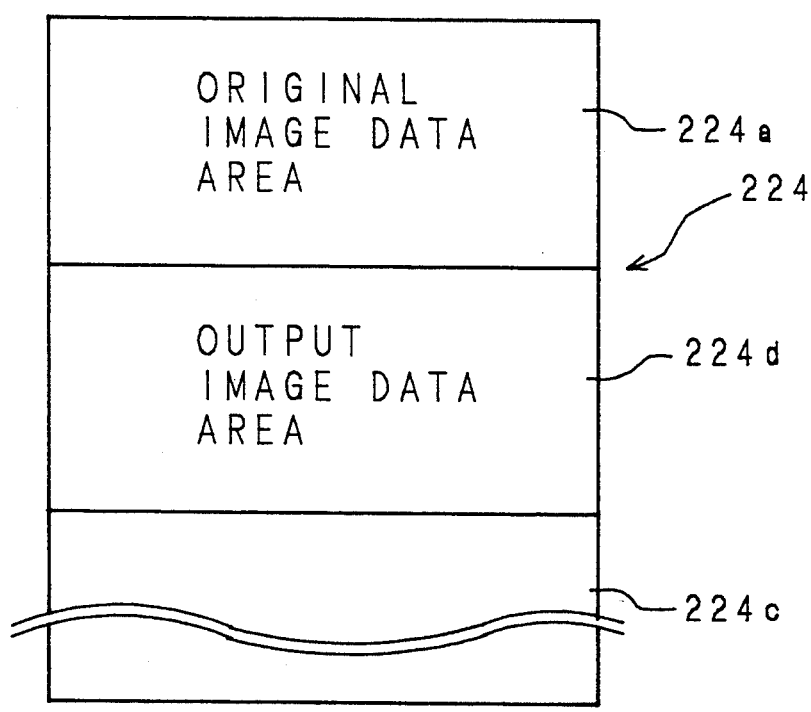
FIGS. 24 and 27 are schematic views showing a memory area of a RAM.

FIG. 24 is a schematic view showing a memory area of a RAM 224, which includes an original image data area 224a storing the original image data of the document read out and converted just into rough data for monitor display, an output image data area 224b storing the image data after the editing and change-magnification processings and an area 224c storing information such as various key inputs, joy ball input, etc. of the control panel 300. The image data areas 224a and 224b have a same capacity, for example, if A3 (297×420 mm) is a reference, $297 \times 420 \times 1 = 124740$ bits $\approx 16$ k bytes are required. When the document is read, image data having the same contents as the original image data area 224a are stored in the output image data area 224b, and thereafter the contents are corrected as the editing operation proceeds in response thereto.

Figure 25:
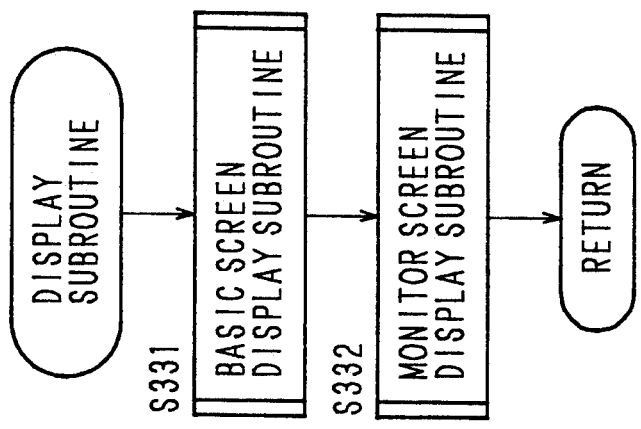

FIG. 25 shows the contents of a display routine in Step S33 of FIG. 14. The display processing is divided into a basic screen display (Step S331) and a monitor screen display (Step S332).

Figure 26:
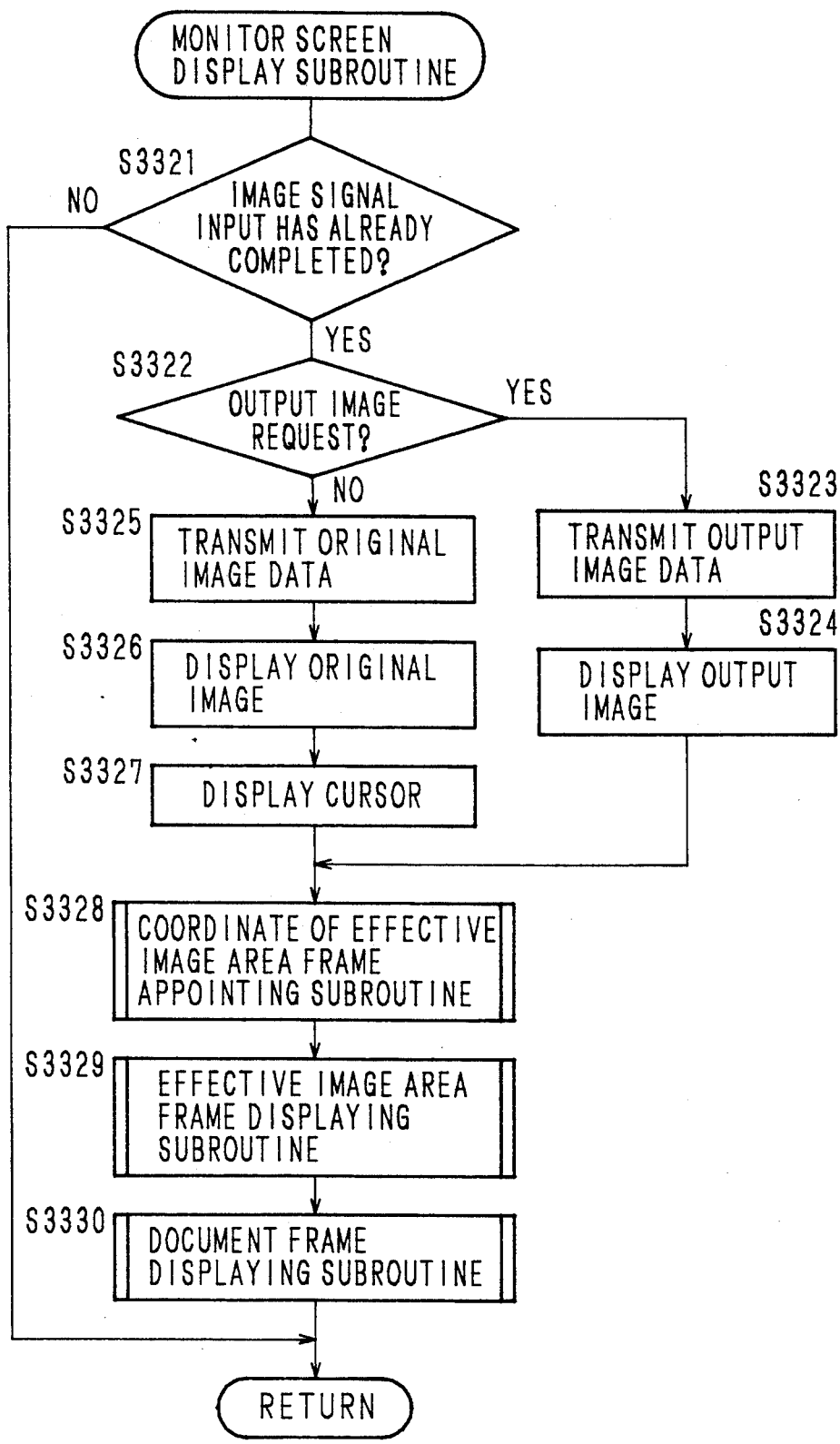

FIG. 26 is a flow chart showing the contents of a monitor screen display routine in Step S332 of FIG. 25, and showing the display control operation in the image monitor area 413 of FIGS. 8 (display D₃) and 9 (display D₄). When the monitor key 316 is turned on, the document is scanned by the control of the second CPU 202 (refer to FIGS. 13, 15, 16, 33), and when all of the image data are inputted to the RAM 224 of the third CPU 203 by the image signal input routine in Step S36 of FIG. 14 (Step S3321 YES), if the output image display based upon the results of changing magnification, editing, etc. is requested (Step S3322 YES), the output image data is transmitted to the VRAM in the LCD controller 221 (Step S3323) and displayed as shown in FIG. 11 (display D₆) (Step S3324), and if not requested (Step S3322 NO), the image data taken in is transmitted to the VRAM in the LCD controller 221 (Step S3325) and displayed as the document original image (Step S3326), and at the same time, the position appoint cursor 431 is displayed (Step S3327). The displayed contents in the image monitor area 413 are changed in such a manner.

Next, after appointing the coordinates of the effective image area frame (Step S3328), the area frame is composed and displayed in the image display (Step S3329). Then, the coordinates of the document frame are appointed on the basis of the document position data obtained in Step S24 (FIG. 13), and the area frame is composed and displayed in the image display (Step S3330). When it takes long time for displaying respective frames in Steps S3328, S3329, S3330, whether the frame display is completed is judged immediately before Step S3328, and if it is completed, the Steps S3328, S3329, S3330 may be skipped.

Figure 27:
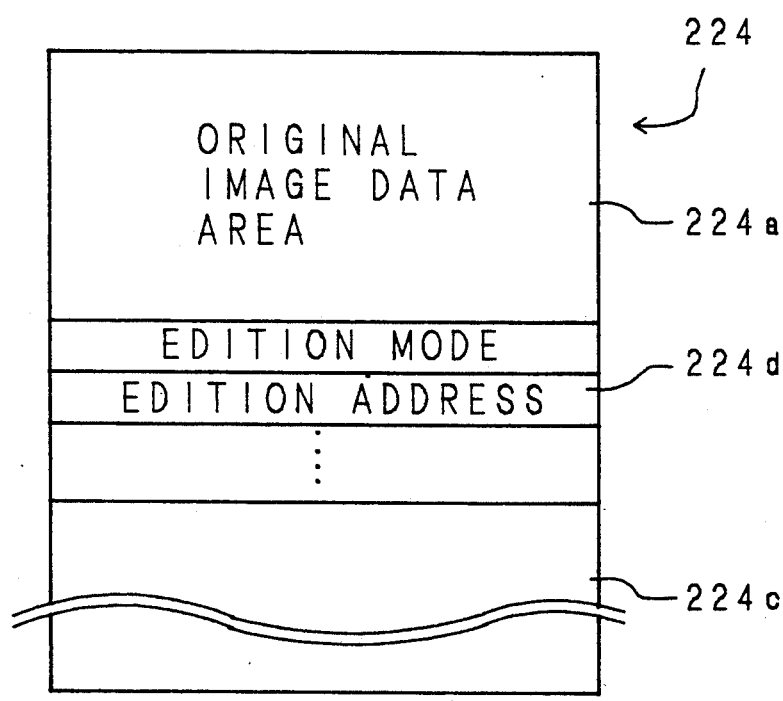

FIG. 27 is a schematic view showing a memory area of the RAM 224 of another embodiment. The RAM 224 includes an original image data area 224a as same as FIG. 24 for storing an original image data of the document read out and converted just into rough data for monitor display, a data area 224d for storing, whenever the editing, change-magnification and other operations proceed, information of the mode of these operations and addresses at each mode, etc., and an area 224c as same as FIG. 24 for storing information such as various key inputs, joy ball input, etc. For example, when the trimming mode is selected, in the data area 224d, information in which the editing mode is the trimming and address information of the vertex of the trimming area are stored.

When the trimming mode is selected, outside the set area linking each vertex indicating the address contained, data which turns off the liquid crystal is transferred to the VRAM in the LCD controller 221, and inside the set area, the original image data is transferred.

In the embodiment, though there is an advantage that the capacity of the RAM 224 may be smaller as compared with the embodiment aforementioned, it takes longer by the processing time for changing over the data than the aforesaid embodiment in which data stored can be outputted as it is, since the calculation by the third CPU 203 is required when transferring the data to the VRAM.

Figure 28:
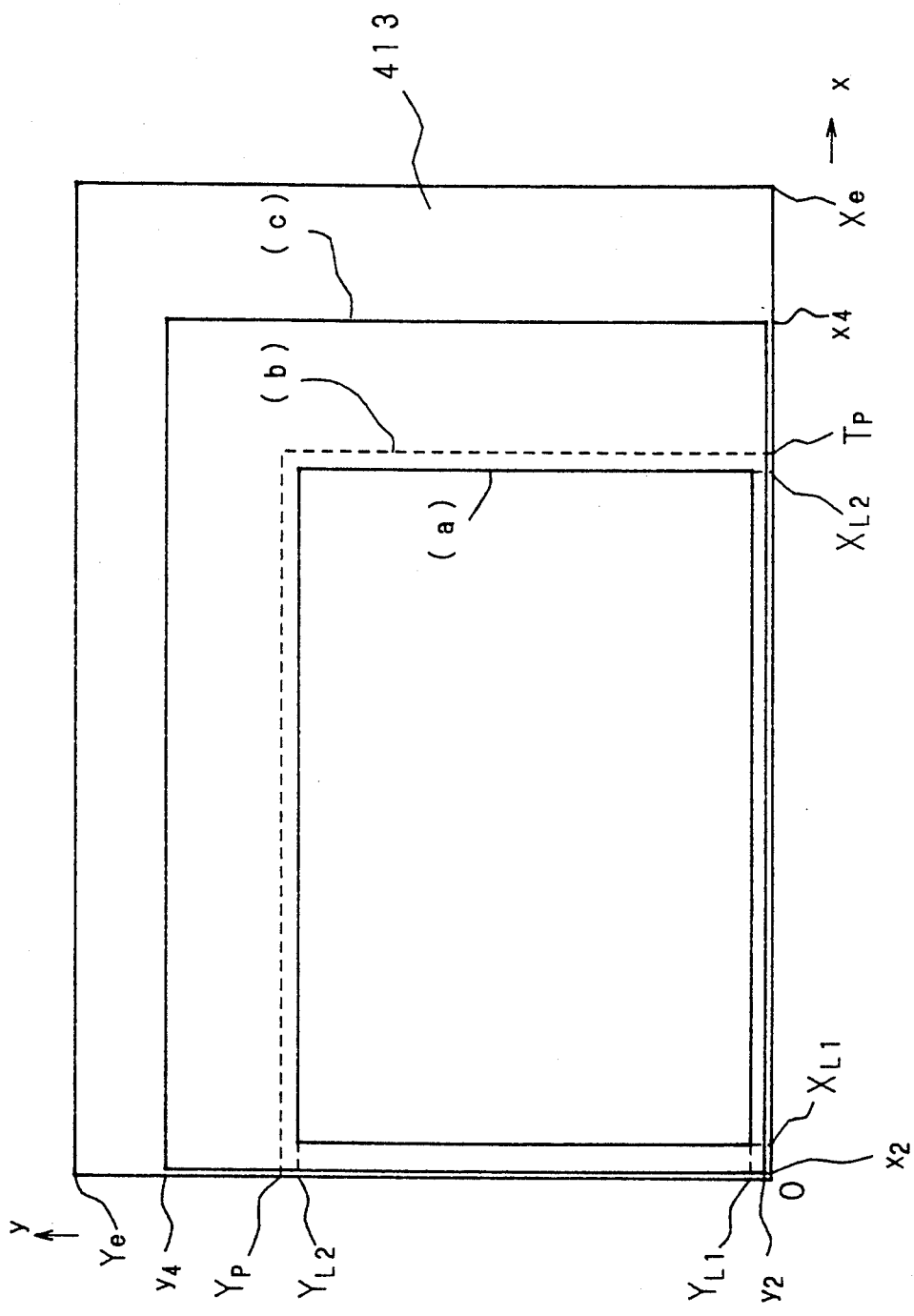
FIG. 28 is a schematic view showing the relationship between an effective image area frame, a paper frame and a document frame.

FIG. 28 is a schematic view showing the relationship between the image monitor area 413 corresponding to an entire area possible to read the document image, and the effective image area frame, paper frame and document frame. In the figure, a solid line (a) indicates the effective image area frame, a broken line (b) indicates the paper frame and a solid line (c) indicates the document frame respectively.

Figure 29:
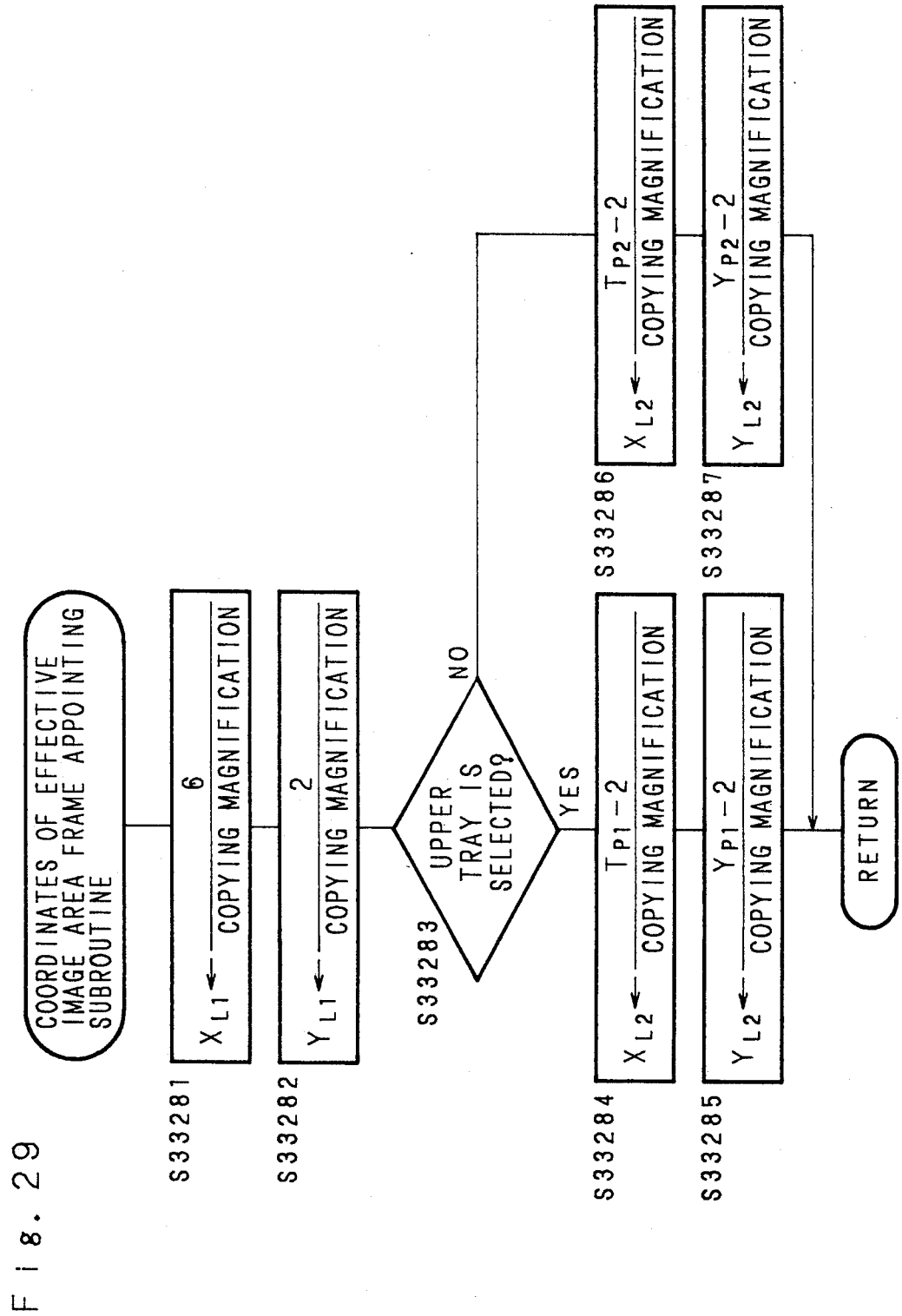

FIG. 29 is a flow chart showing the contents of an appointing routine of the effective image area frame coordinates in Step S3328 of FIG. 26, in which first the coordinates $X_{L1}$, $Y_{L1}$ shown in FIG. 28 are appointed (Steps S33281, S33282). Since image loss areas are insured on paper for 6 (mm) on the front edge and for 2 (mm) each on the side and rear edges, in its indication, $X_{L1}$ (mm) = 6/magnification and $Y_{L1}$ (mm) = 2/magnification are appointed respectively as the coordinates $X_{L1}$, $Y_{L1}$. When the upper paper feed tray 50 is selected (Step S33283 YES), the results calculated by using paper length data $T_{p1}$ and paper width data $Y_{p1}$ of the upper paper feed tray 50 obtained by the paper size detecting routine in Step S16 (FIG. 12) are set to $X_{L2}$ and $Y_{L2}$ (Steps S33284, S33285). Meanwhile, when the lower paper feed tray 50 is selected (Step S33283 NO), the results calculated by using paper length data $T_{p2}$ and paper width data $Y_{p2}$ of the lower paper feed tray 50 obtained by the paper size detecting routine in Step S16 (FIG. 12) are set to $X_{L2}$ and $Y_{L2}$ (Steps S33286, S33287).

Figure 30:
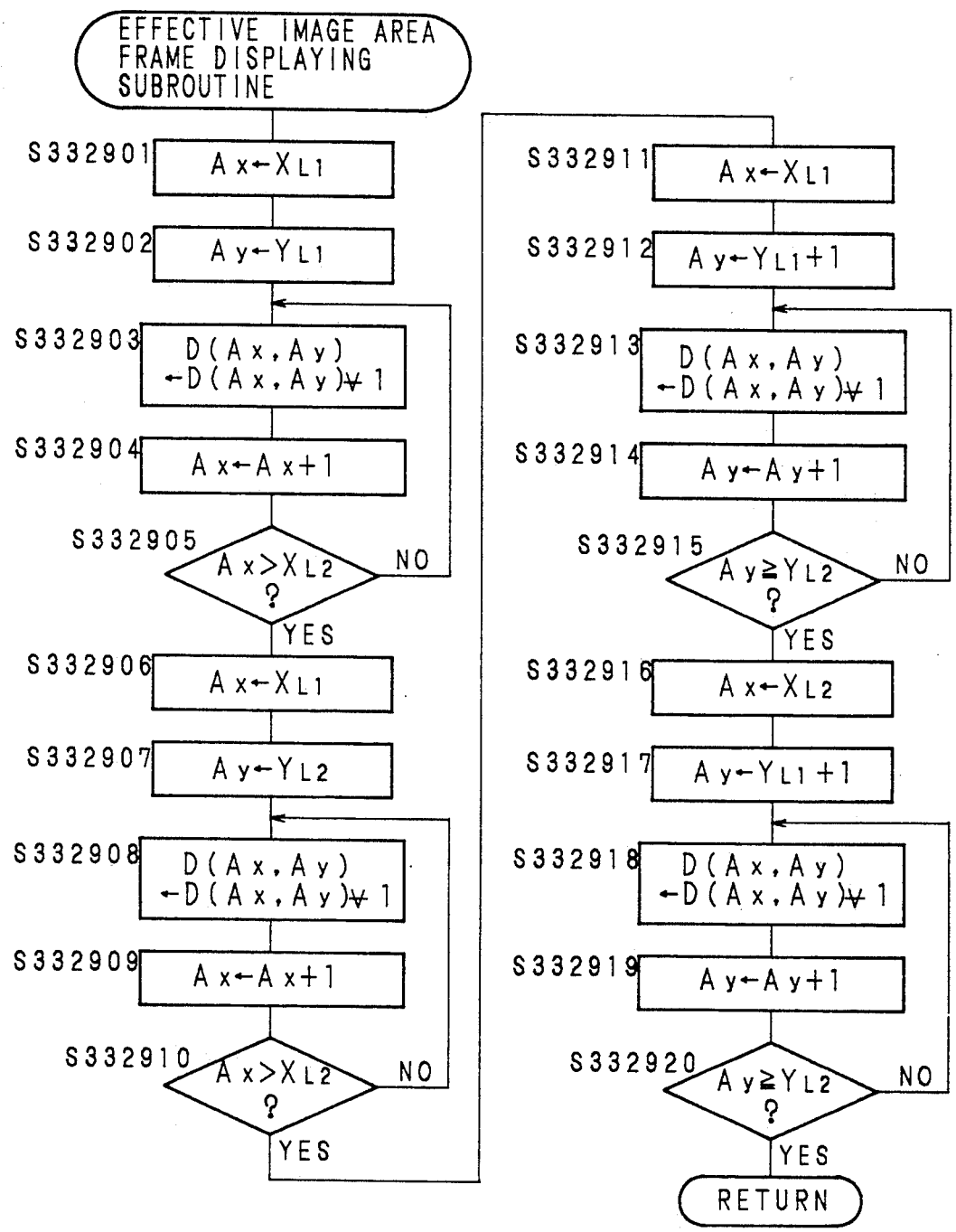

FIG. 30 is a flow chart showing the contents of an effective image area frame displaying routine in Step S3329 of FIG. 26, in which $X_{L1}$ is set to x-component address data Ax (Step S332901), and $Y_{L1}$ is set to y-component address data Ay (Step S332902). Next, display data D (Ax, Ay) of the image monitor area in the address data till then are inverted by taking Exclusive OR of the data till then and "1" (Step S332903), and added one by one to Ax (Step S332904). The processing is continued until Ax becomes larger than $X_{L2}$ (Step S332905 NO), and a horizontal line is drawn from a position of the coordinates ($X_{L1}$, $Y_{L1}$) to a position of the coordinates ($X_{L2}$, $Y_{L1}$) of FIG. 28 by inverting OFF/ON of the liquid crystal contrary to the image data. When Ax surpasses $X_{L2}$ (Step S332905 YES), after resetting Ax and Ay to $X_{L1}$ and $Y_{L2}$ respectively (Steps S332906, S332907), the processing exactly as same as the previous processing is conducted (Steps S332908, S332909, S332910), and a horizontal line is drawn from the position of the coordinates ($X_{L1}$, $Y_{L2}$) to the position of the coordinates ($X_{L2}$, $Y_{L2}$) of FIG. 28.

Next, Ax and Ay are reset to $X_{L1}$ and $Y_{L1}+1$ (Steps S332911, S332912). Then, displaying data D(Ax, Ay) is inverted by taking Exclusive OR of the data till then and "1" (Step S332913) and added one by one to Ay (Step S332914). The processing is continued until Ay becomes or larger than $Y_{L2}$ (Step S332915 NO), and a vertical line is drawn from a position of the coordinates ($X_{L1}$, $Y_{L1}$) to a position of the coordinates ($X_{L1}$, $Y_{L2}$) of FIG. 28. When Ay becomes or larger than $Y_{L2}$ (Step S332915 YES), Ax and Ay are reset to $X_{L2}$ and $Y_{L1}+1$ (Steps S332916, S332917), and the processing exactly as same as the previous processing is conducted (Steps S332918, S332919, S332920), then a vertical line is drawn from a position of the coordinates ($X_{L2}$, $Y_{L1}$) to a position of the coordinates ($X_{L2}$, $Y_{L2}$) of FIG. 28. In such a manner, a frame 424 indicating the effective image area based upon the paper size contained in the paper feed tray selected is composed and displayed on the crystal-liquid display panel 222 together with the original image.

Since the effective image area frame varies responsive to the copying magnification, a range in the document being copied can be easily confirmed even at a different magnification.

The purpose of providing the image loss area on the paper front edge is that the image can not be formed in the portion held by the chucking claw 52, and the reason for providing the image loss areas on the paper side and rear edges is to prevent a toner from sticking onto the transfer drum 51. In other words, the image loss areas are set to prevent the toner transfer outside the paper on the transfer drum, and taking into account of variations of the paper chucking positions. By displaying the effective image area frame, as compared with the paper size display, it can be known more correctly that which area of the document is to be copied.

Figure 31:
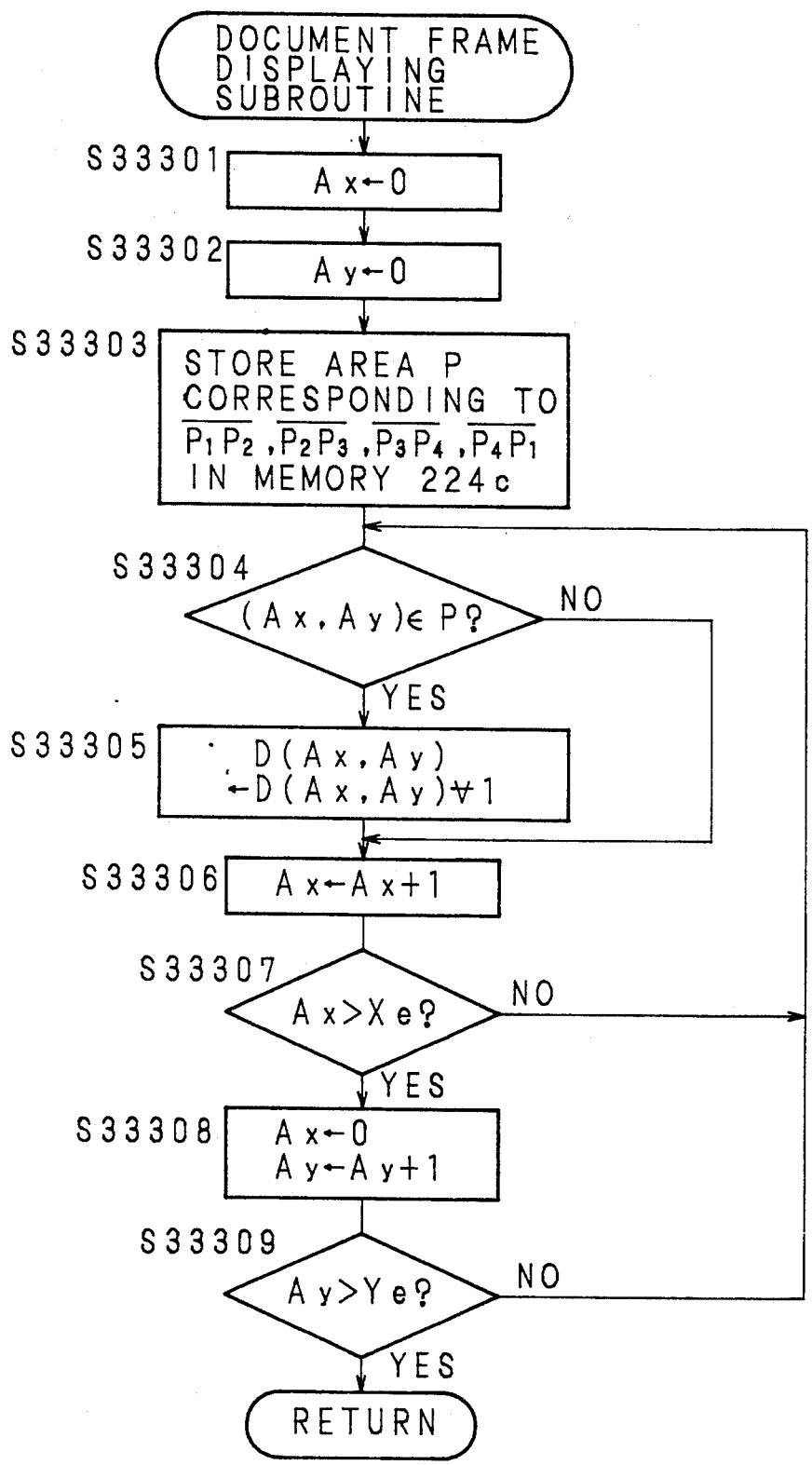

FIG. 31 is a flow chart showing the contents of a document frame display routine in Step S3330 of FIG. 26, in which on the basis of $P_1$, $P_2$, $P_3$, $P_4$ detected by the circuit shown in FIG. 19, $\overline{P_1P_2}$, $\overline{P_2P_3}$, $\overline{P_3P_4}$, $\overline{P_4P_1}$ are drawn on the liquid-crystal display panel 222.

First, address data Ax, Ay of x- and y-component are set to 0 (Steps S33301, S33302). Next, a document frame display area P of $\overline{P_1P_2}$, $\overline{P_2P_3}$, $\overline{P_3P_4}$, $\overline{P_4P_1}$ to be displayed on the image monitor area 413 on the basis of $P_1$, $P_2$, $P_3$, $P_4$ (refer to FIG. 20) detected by the circuit shown in FIG. 19 is stored in the memory 224c (Step S33303). Then, whether address data (Ax, Ay) are included in the document frame display area P is judged (Step S33304). If included (Step S33304 YES), the display data D (Ax, Ay) of the image monitor are inverted (Step S33305), and if not included (Step S33304 NO), the procedure is moved to Step S33306 as it is and add Ax one by one. Processings in Steps S33304~S33306 are continued till Ax becomes larger than Xe (Step S33307 NO), when Ax becomes larger than Xe (Step S33307 YES), Ax is set to 0 (Step S33308) and Ay is added one by one. Processings in Steps S33304~S33308 are continued till Ay becomes larger than Ye. When Ay becomes larger than Ye (Step S33309 YES) or the processing of the document frame display is completed, the routine is finished.

As the document frame 425 is displayed in the image monitor area 413, a setting state of the document can be confirmed easily.

Since both the document frame and the effective image area frame wherein an image is actually copied are displayed in such a way, the relative position between the two can be grasped instantaneously. And the relative position between the two can be easily judged, the operator can readily judge whether the magnification has to be changed.

Figure 32:
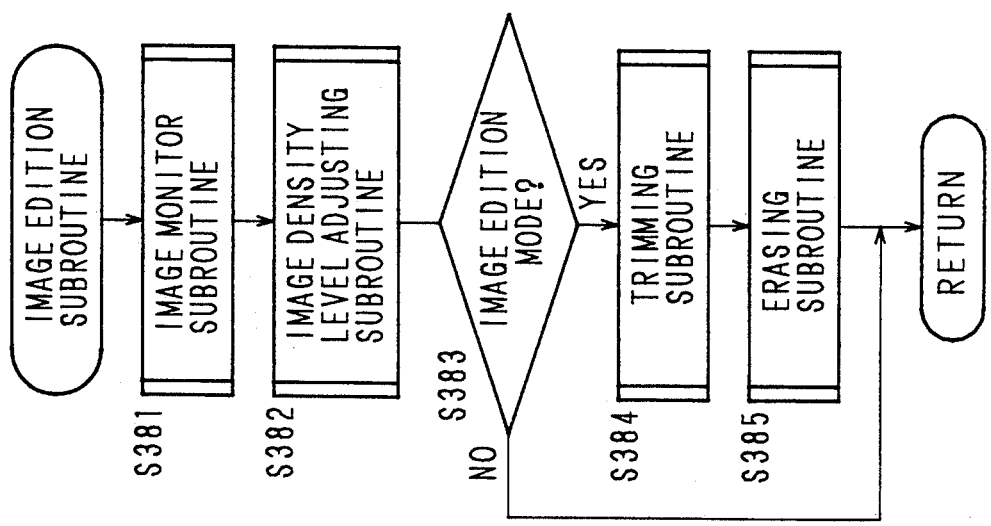

FIG. 32 is a flow chart showing the contents of an image edition routine in Step S38 shown in FIG. 14. First, the image monitor is motivated (Step S381), a display density level of the image monitor is adjusted (Step S382), and when the image edition mode is set (Step S383 YES), processings related to a trimming mode (Step S384) and an erasing mode (Step S385) are conducted.

Figure 33:
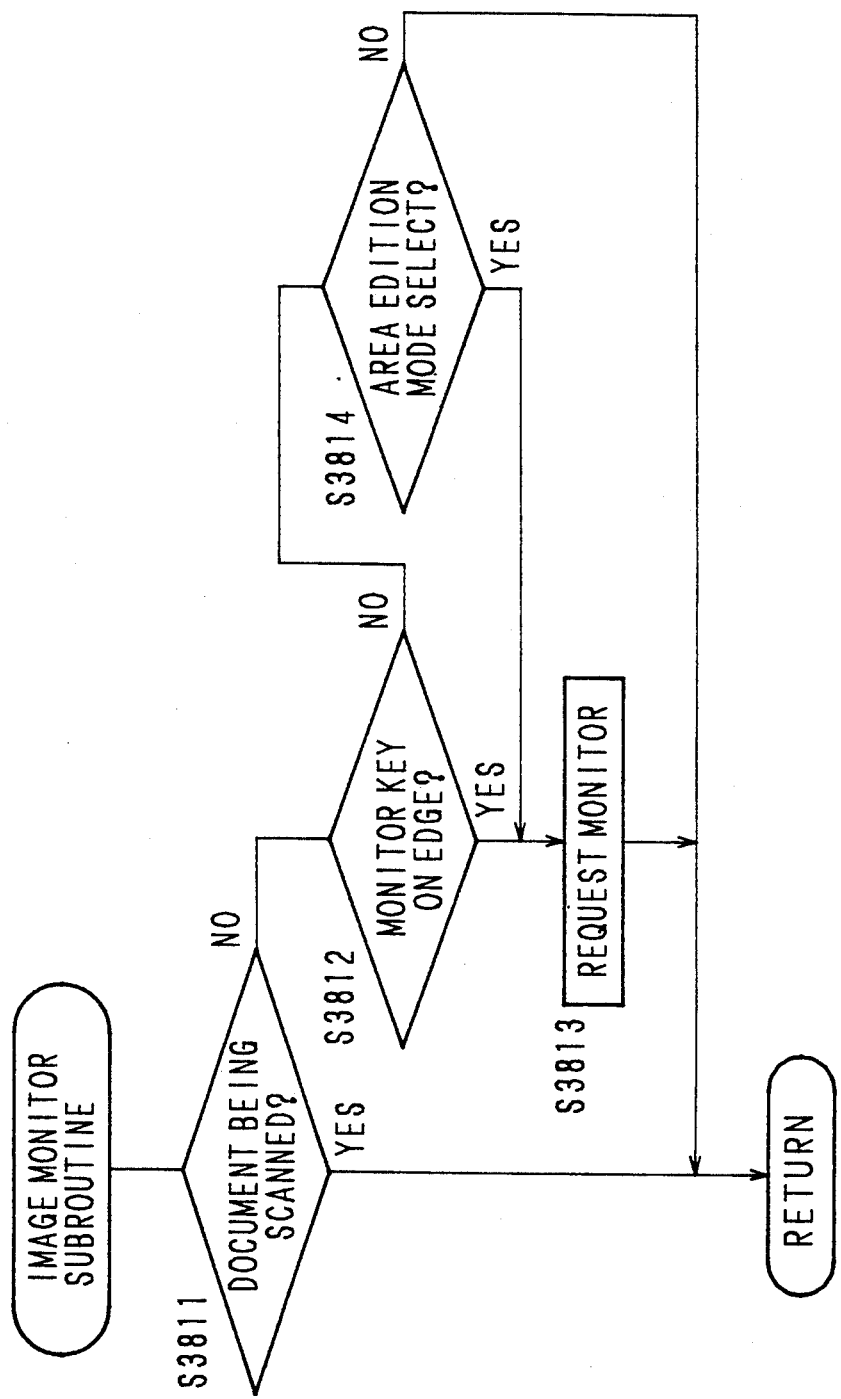

FIG. 33 is a flow chart showing the contents of an image monitor routine in Step S381 shown in FIG. 15. If the document is not scanned by the scanner 10 to obtain an image signal (Step S3811 NO), when the monitor key 316 has changed from OFF to ON (Step S3812 YES) or the area edition mode has been selected (Step S3814 YES) even if the monitor key 316 is not ON-EDGE (a time when a key changes from OFF to ON is called ON-EDGE), the monitor image is requested to be displayed (Step S3813).

Figure 34A:
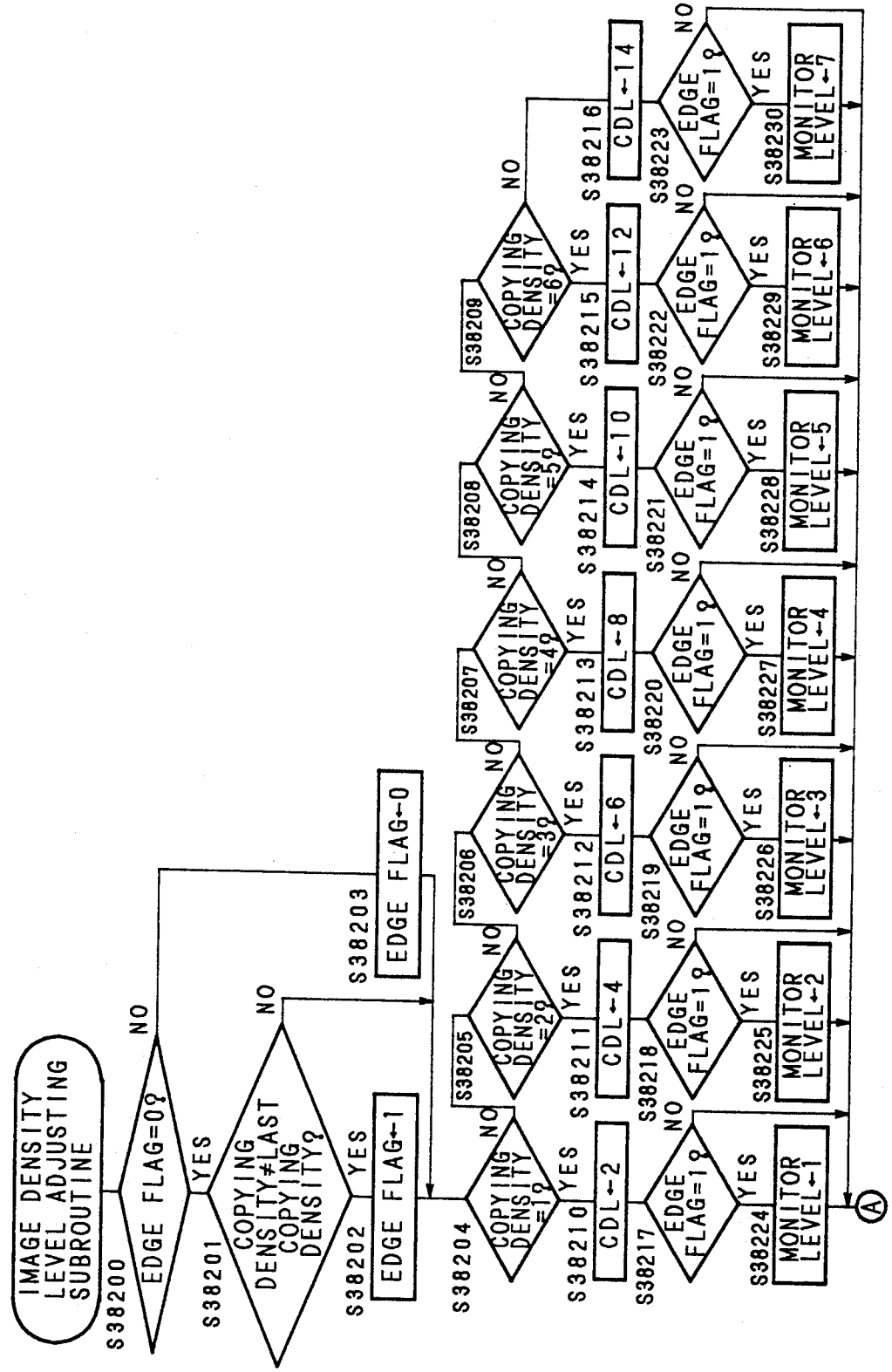
Figure 34B:
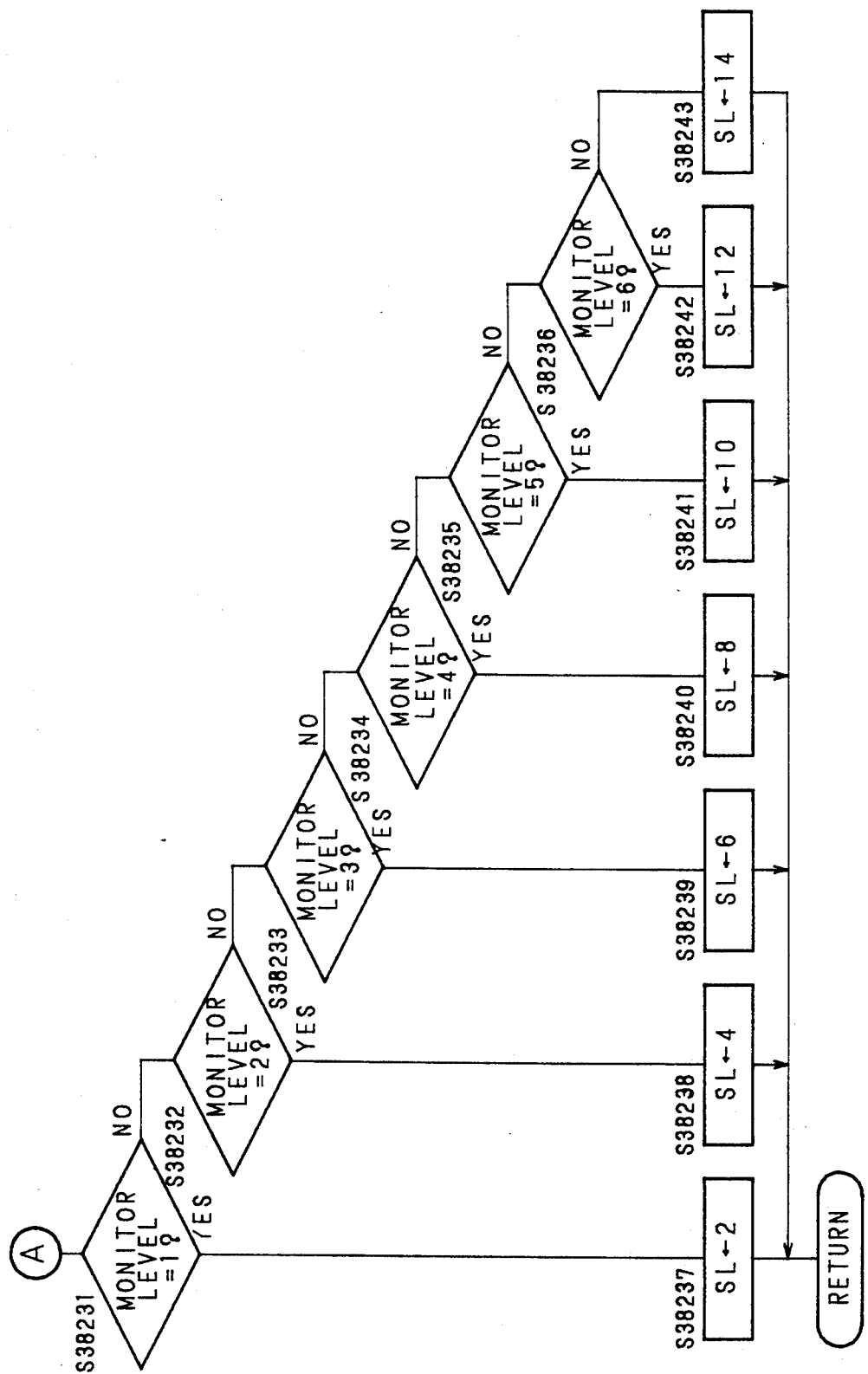

FIG. 34 is a flow chart showing the contents of a density level adjusting routine in Step S382 shown in FIG. 32. In interlocking of an actual copy density level and a monitor image density level (monitor level), when appointment of the copy density level is changed, in agreement with the change, both the actual copy density level and the monitor level are changed, while when appointment of the monitor level is changed, in agreement with the change, only the monitor level is changed.

In Steps S38200~S38203, a change-time of the copy density level display 407 (refer to FIG. 6) on the liquid-crystal display panel 222 is detected. When an edge flag is 0 (Step S38200 YES) (the flag is set to 0 at initialization) and the previous copy density is different from the new copy density (Step S38201 YES), the edge flag is set to 1 (Step S38202). If the subroutine is called (Step S38200 NO) after the edge flag has once been set to 1, it is returned to 0 (Step S38203). Thereafter, responsive to the appointment of the copy density (Steps S38204~S38209), a counter CDL deciding the actual copy density level is set (Steps S38210~S38216). This value becomes the aforesaid threshold level (4 bits data (e) in FIG. 18) when the original image data read are converted into display data for indicating ON and OFF of the liquid crystal. When the edge flag is 1 (Step S38217~S38223 YES) in respective copy densities, in agreement with appointment of the copy density, the monitor level is set (Steps S38224~S38230). When the edge flag is 0 (Steps S38217~S38223 NO), the procedure is returned to the main routine and the monitor level is retained in the previous state.

Responsive to appointment of the monitor level (displayed contents of the monitor level display 423 (refer to FIG. 8)) (Steps S38231~S38236), comparison data (FIG. 18(e)) SL is set (Steps S38237~38243).

As described above, by actual appointment change of the copy density or direct setting change of the monitor level, the density change of the monitor level is accepted.

Figure 35:
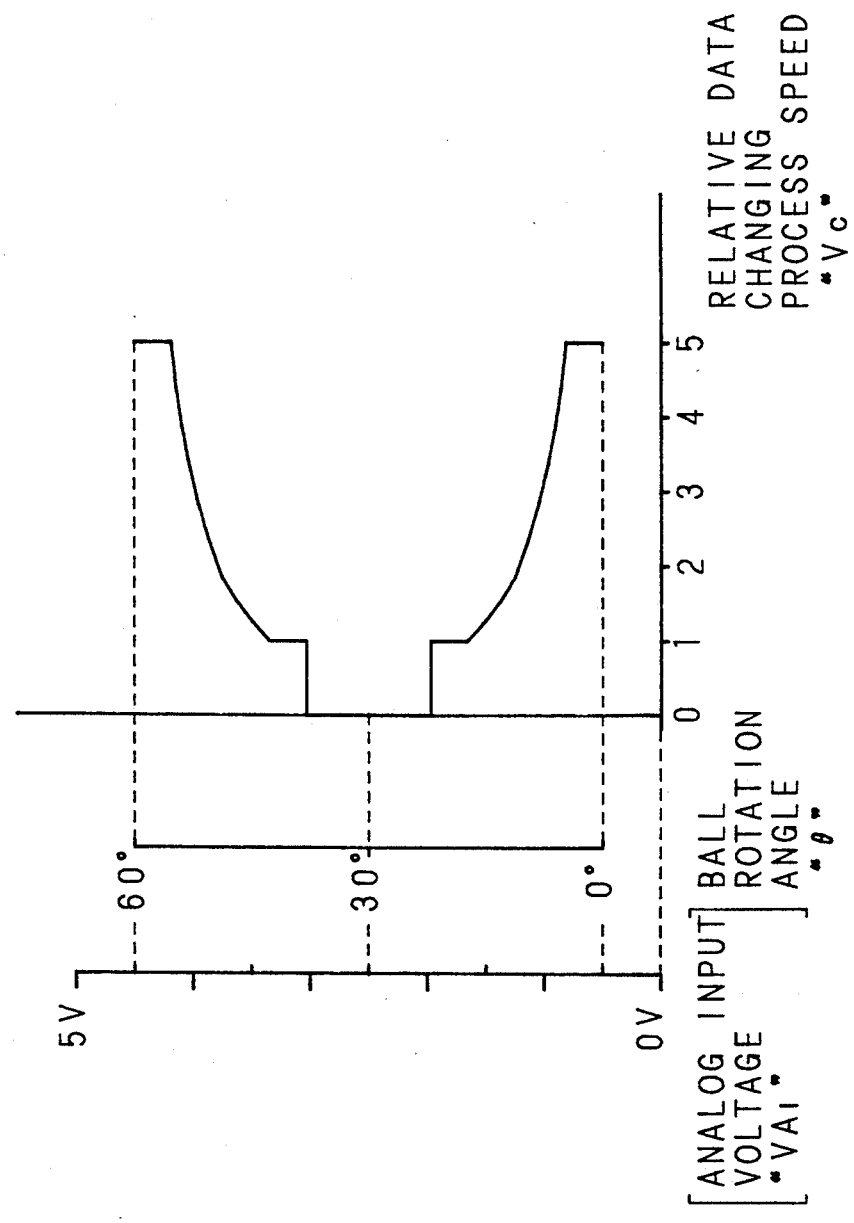
FIG. 35 is a graph showing the relationship between a rotation angle of a joy ball and a processing speed.

Next, control procedures with respect to the operation of the joy ball 313 will be described. FIG. 35 is a graph showing the relationship between a rotation angle $\theta$ of the stick 313a of the joy ball 313 and a processing speed Vc, FIG. 36 is a table showing the relationship between $\theta$ and Vc and reference timer value TM for deciding the moving speed Vc in each cursor, and FIG. 37 is a schematic view showing a movable range of the stick 313a.

Figure 37:
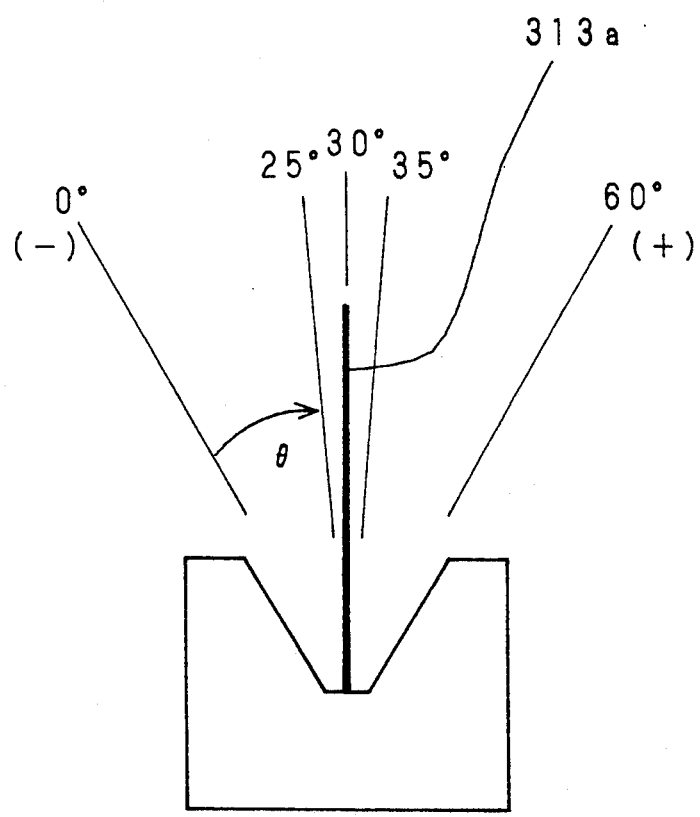
FIG. 37 is a schematic view showing a movable range of a stick portion of the joy ball.

As shown in FIG. 37, when a center position in which the stick 313a returns automatically is shown by $\theta = 30°$, the stick 313a is movable within the range of $\theta = 0° \sim 60°$, and responsive to the angle $\theta$, the moving speed Vc of a menu cursor and a pointing cursor varies as shown in FIG. 35. In FIG. 35, though the speed variation is represented in one dimension, in practice, it is in two dimensions as shown in FIG. 4, and controlled independently in the directions X and Y respectively. When $25° < \theta < 35°$, the cursor (menu cursor or pointing cursor 431) is stationary (Vc=0). When $20° \leq \theta \leq 25°$ or $35° \leq \theta \leq 40°$, the cursor is moved at a certain reference speed (Vc=1). When $0° \leq \theta \leq 5°$ or $55° \leq \theta \leq 60°$, the cursor moves at a speed of 5 times the reference speed (Vc=5). When $5° < \theta < 20°$ or $40° < \theta < 55°$, the cursor moves at a speed Vc=1~5 by a quadratic functional composition of $\theta$ shown in FIG. 36.

Figure 38A:
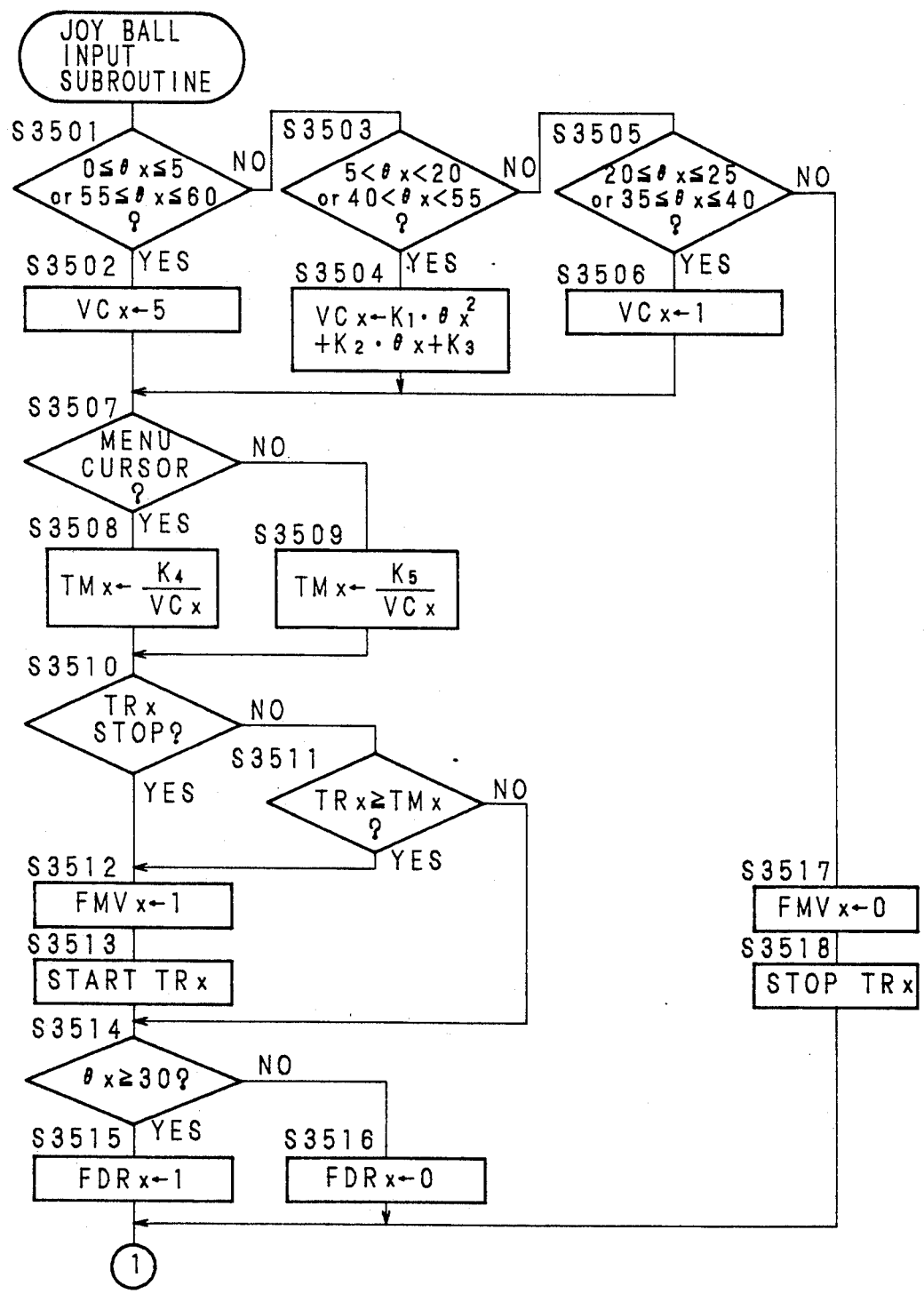

FIG. 38 is a flow chart showing the controlled contents of a moving speed of the cursor, showing the contents in Step S35 shown in FIG. 14.

Depending upon the rotation angle $\theta$x in the direction X (Steps S3501, S3503, S3505), a value between 1 and 5 is set for the x-component moving speed VCx (Steps S3502, S3504, S3506). Here, constant values $K_1$, $K_2$ and $K_3$ in Step S3504 are respectively 0.007619, $-0.4571$ and 7.091 as shown in FIG. 36. When $25 < \theta x < 35$ (Step S3505 NO), a flag FMVx requesting the cursor to move in the direction X is reset (Step S3517), and a comparison timer TRx for deciding a moving timing in the direction X is stopped (Step S3518). When the flag FMVx is set to 1, in either of Steps S37, S38, S39 (FIG. 14), the cursor is processed to move and the flag is returned to 0.

When a screen shows the moving state of the menu cursor as shown in FIGS. 6, 7, 8 after VCx is set (Steps S3507 YES), $K_4$/VCx is set in a reference timer value TMx deciding the x-component moving speed (Step S3508). When a screen shows the moving state of the position appoint cursor as shown in FIGS. 9, 10 after VCx is set (Step S3507 NO), $K_5$/VCx is set in the reference timer value TMx (Step S3509). Since $K_4 = 1000$ (msec) and $K_5 = 50$ (msec), the reference timer value TMx shows the result shown in FIG. 36.

When the comparison timer TRx is stopped and not in adding operation (Step S3510 YES), and the comparison timer value TRx reaches the reference timer value TMx (Steps S3511 YES), the flag FMVx is set to 1 (Step S3512) and the comparison timer TRx is started to count from 0 (Step S3513).

The moment the joy ball 313 is rotated other than $25 < \theta < 35$, the flag FMVx becomes 1 and the cursor starts moving, and thereafter the cursor moves at a reference timer time corresponding to the rotating quantity. Here, the time is a value corresponding to the rotating quantity of the joy ball 313 at that moment, and the value is compared with the continuously operating reference timer value to move the cursor, so that a high moving responsiveness can be obtained. If the rotation angle of the joy ball 313 is returned to $25 < \theta < 35$ after completing the desired movement, the cursor is not moved thereafter.

Next, it is judged whether $\theta$x is 30 or more (Step S3514), if it is (Step S3514 YES), the x-component moving direction flag FDRx is set to 1 (Step S3515) and if not (Step S3514 NO), the flag FDRx is set to 0 (Step S3516). When FDRx=1, the cursor moves in the direction X(+) (rightward in FIG. 2), and when FDRx=0, it moves in the direction X(−1) (leftward in FIG. 2).

Figure 38B:
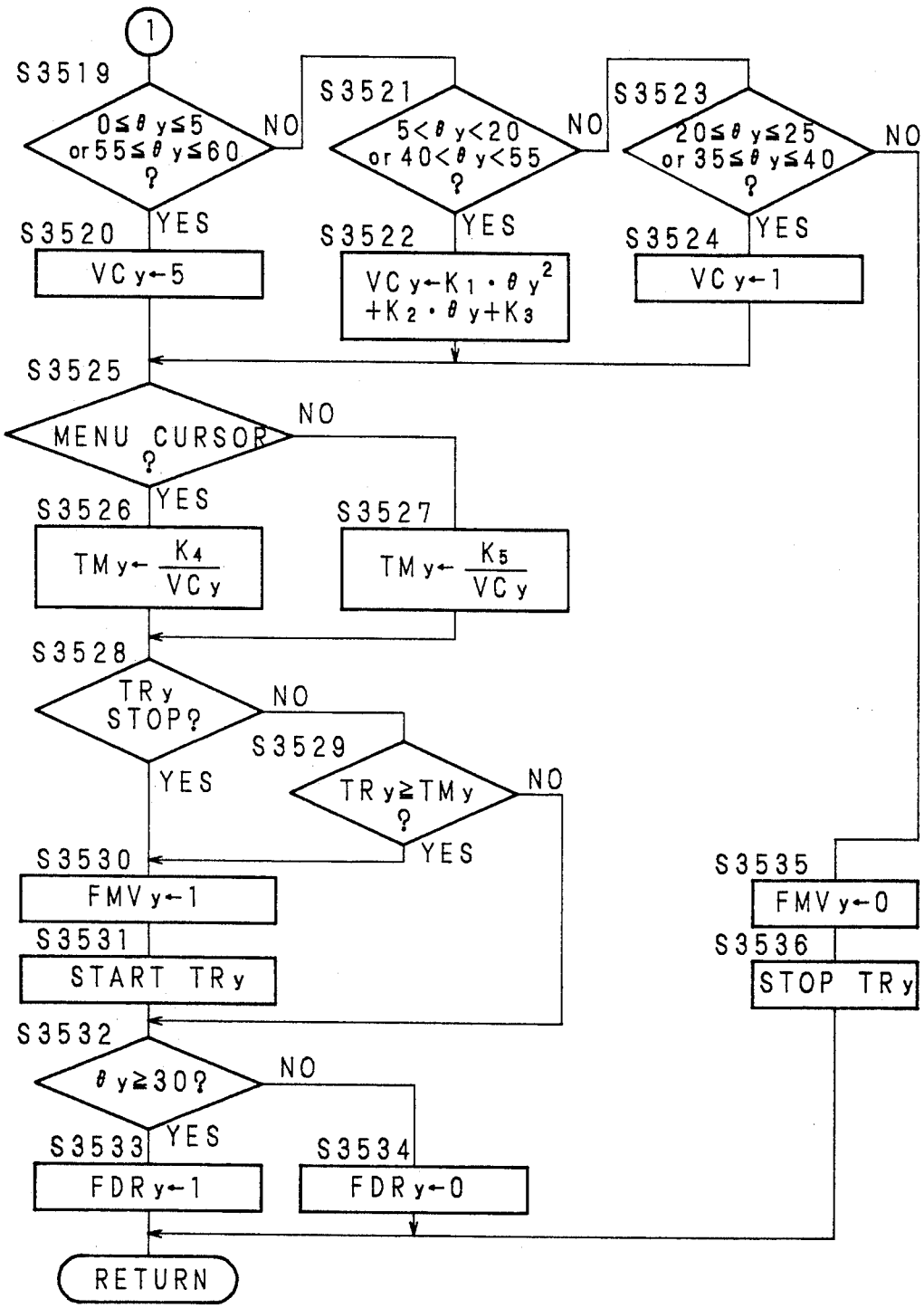

Processings desired above are conducted exactly similarly for the y-component direction (refer to Steps S3519~S3536 shown in FIG. 38(b)) to appoint a moving request flag FMVy and a moving direction flag FDRy in the direction y.

The moving request flags FMVx, FMVy and the moving direction flags FDRx, FDRy decided as aforementioned are judged in either of Steps S37, S38, S39 (FIG. 14), in which various processings are conducted responsive to the screen state in the liquid-crystal display panel 222, to move the menu cursor or the position appoint cursor. The moving request flags FMVx, FMVy are returned to "0" when moving processings are conducted in these routines, and kept waiting till the flags are set to "1" in Step S35.

Next, a second embodiment of the present invention will be described. In the embodiment aforementioned, though effective image area frame 424 and the document frame 425 are displayed in the image monitor area 413 together with the document image, in this embodiment, the paper frame 426 indicating the paper size selected is displayed together with the document image.

In the following, only the portions different from the first embodiment are described, and the portions whose configuration, operation and so on are same or like are omitted.

FIG. 39 is a schematic view showing the displayed contents (hereinafter referred to as display D4) of the second embodiment when the image monitor display is completed in accordance with the information display in the state shown in FIG. 8. In FIG. 8, when a document is set on the original glass plate 15 responsive to the information display and the monitor key 316 is turned on, the document is scanned by the scanner 10 and a document image is displayed on the image monitor area 413 when the scanning is finished. When the trimming menu 422a is selected in the state wherein the document image is displayed, the position appoint cursor 431 appears in the image monitor area 413. At this time, in the image monitor area 413, the paper frame 426 indicating a paper size selected is displayed in agreement with the document image.

Figure 40:
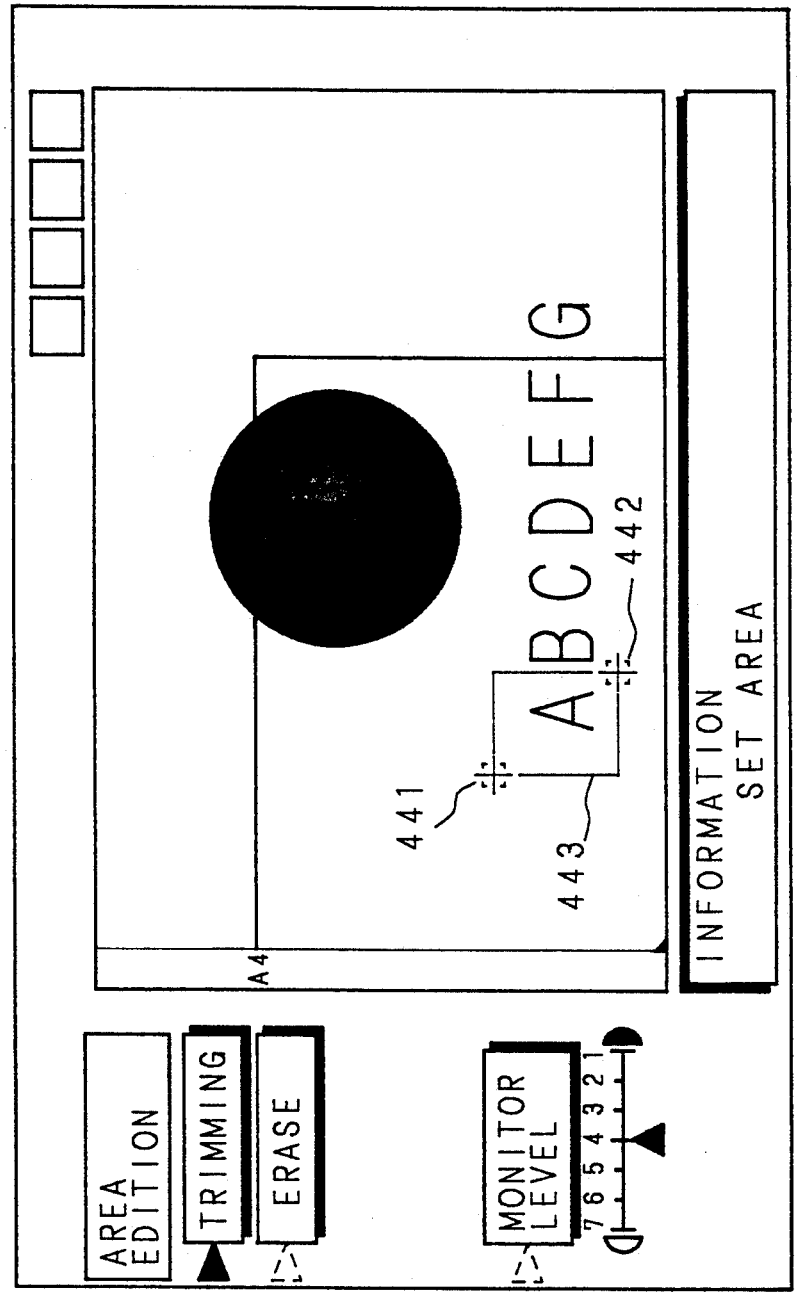

FIG. 40 is a schematic view showing the displayed contents (hereinafter referred to as display D5) when area setting of the trimming mode is actually conducted in the state shown in FIG. 39. When the joy ball 313 is rotated to move the position appoint cursor 431 from the position shown in FIG. 39 to a position 441 shown in FIG. 40, and the set key 314 is turned on, the position appoint cursor 431 is fixed and displayed at the position 441. When the joy ball 313 is further rotated to move the position appoint cursor 431 from the position 441 to a position 442, and the set key 314 is turned on, the position appoint cursor 431 is fixed and displayed at the position 442. A quadrangle 443 having two points fixed and displayed in such a way as opposite ends of a diagonal is designated as a trimming set area.

Figure 41:
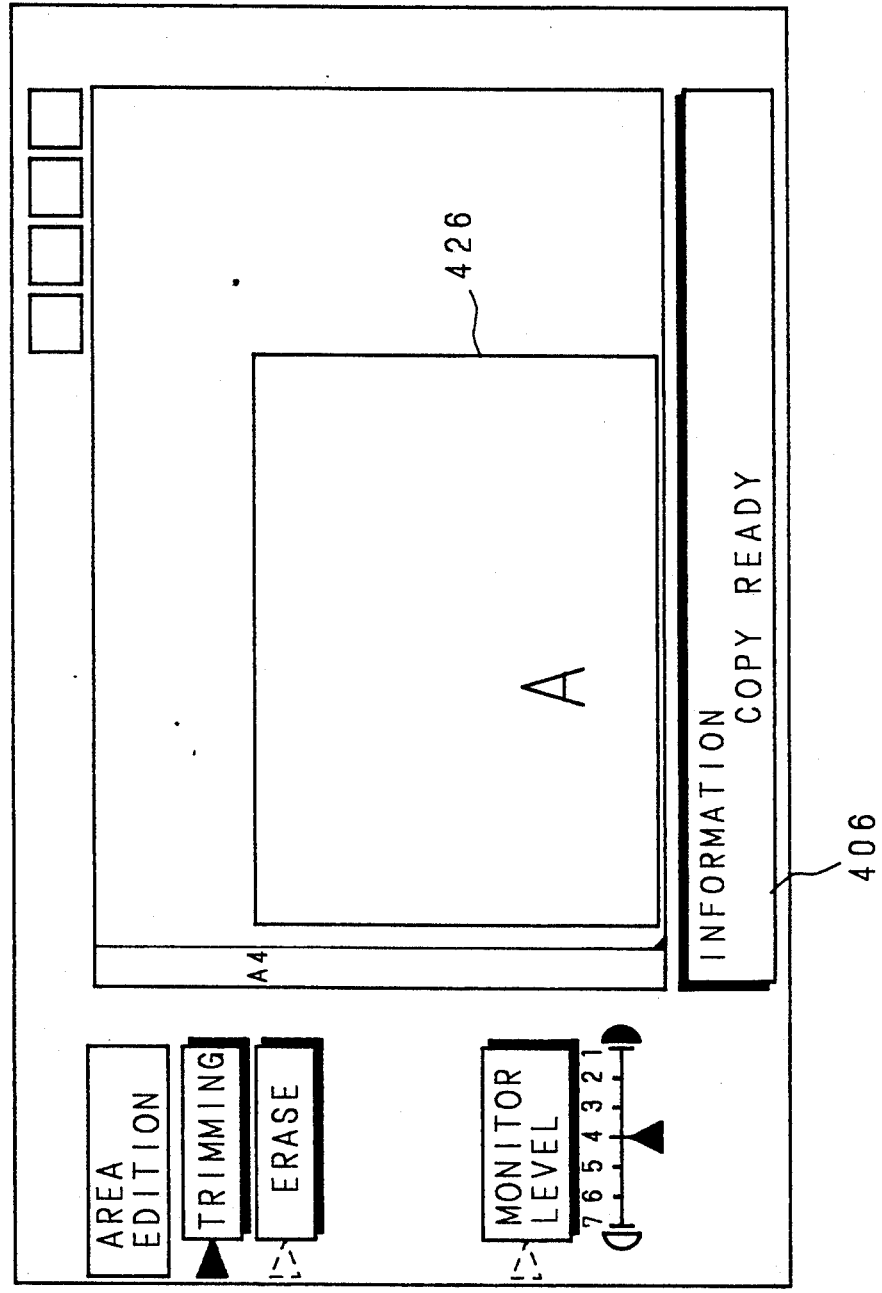

FIG. 41 is a schematic view showing the displayed contents (hereinafter referred to as display D6) when the set key 314 is turned on after the position of the second point is set in the state shown in FIG. 40. When the set key 314 is turned on after setting the trimming area, the image (M) in the set area is remained and the rest is erased. At this time, the paper frame 426 is remained displayed so that whether the remained image can be copied may be judged readily. Here, the area setting in the trimming mode is finished, so that "COPY READY" is displayed on the information display 406.

Procedures for setting the other area by the trimming mode after setting one area thereby will be described, together with the displayed contents on the liquid-crystal display panel 222 on the occasion.

After setting one area (display D6 shown in FIG. 41), first the set key 314 is turned on and a document original image is again displayed on the image monitor area 413 as shown in FIG. 39 (display D4). Then, at this time, the position appoint cursor 431 will appear at the second position 442 (refer to FIG. 40) in the previous area setting to show the quadrangle 443 indicating the previous set area, and "SET AREA" is displayed on the information display 406. Next, exactly as same as the first area setting aforementioned, the joy ball 313 is rotated to move the position appoint cursor 431 to a desired position, and the set key 314 is turned on to appoint a first point of the new set area. A second point of the new set area is appointed in a same way. Then, in the image monitor area 413, the document image in the previous and new set areas is remained, the rest of the image is erased, and "COPY READY" is displayed on the information display 406.

By repeating such operations, the third and fourth . . . area setting can be conducted.

Procedures for setting an erase area in the set area of the trimming mode will be described together with the displayed contents of the liquid-crystal display panel 222 on the occasion.

First, the joy ball 313 is rotated in the direction Y(−) to move the menu cursor 421a so as to light 421b, then the set key 314 is turned on to change to the erase mode from the trimming mode.

Then, exactly the same operation as the area setting of the trimming mode is conducted to set the erase mode area.

Figure 42:
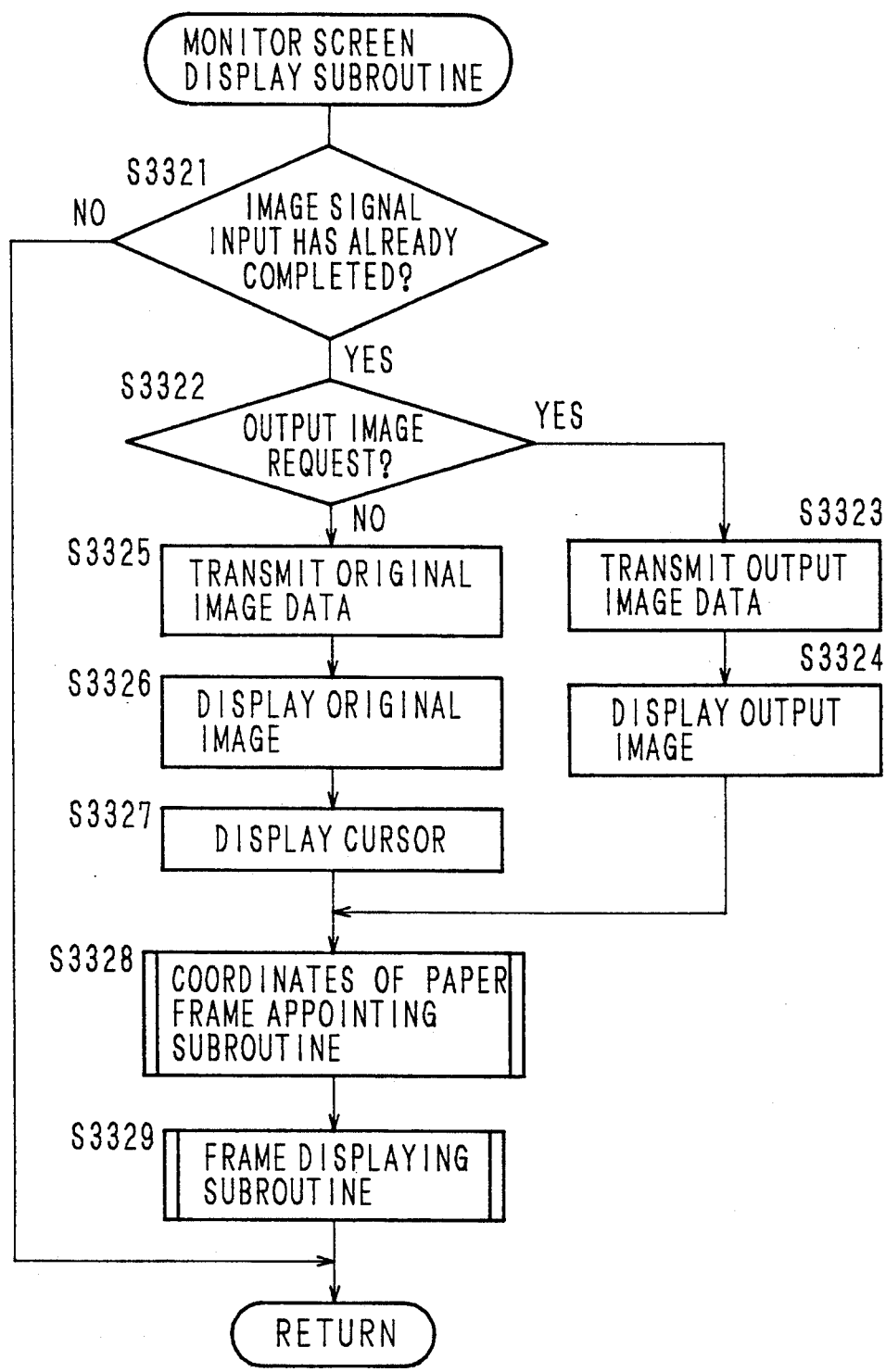
FIGS. 42~45 are flow charts showing subroutines of the main routines of the second embodiment.

FIG. 42 is a flow chart showing the contents of a monitor image display routine in Step S332 shown in FIG. 23 in the second embodiment, which shows the control operation of displays in the image monitor area 413 shown in FIG. 8 (display D3) and FIG. 39 (display D4). By turning on the monitor key 316, a document is scanned under the control of the second CPU 202 (refer to FIGS. 13, 15, 16, 30), when all of the image data are inputted to the RAM 224 in the third CPU 203 by an image signal input routine in Step S36 of FIG. 14 (Step S3321 YES), and if the output image display on the basis of the change magnification and editing results is requested (Step S3322 YES), the output image data is transmitted to the VRAM in the LCD controller 221 (Step S3323) to be displayed as shown in FIG. 41 (display D6) (Step S3324), and if not requested (Step S3322 NO), image data taken in is transmitted to the VRAM in the LCD controller 221 (Step S3325) to be displayed as the document original image (Step S3326), and to display the position appoint cursor 431 (Step S3327). Displayed contents in the image monitor area 413 are changed in such a manner.

Then, after appointing the coordinates of the paper frame (Step S3328), the area frame is composed and displayed in the image display (Step S3329).

Figure 43:
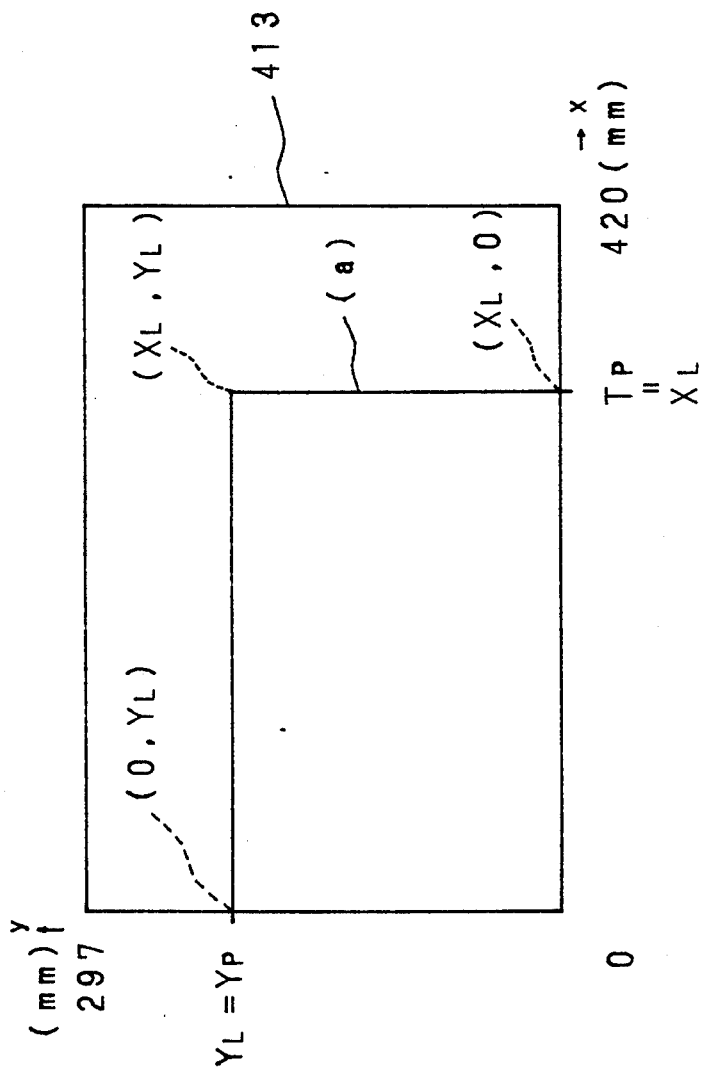
Figure 44:
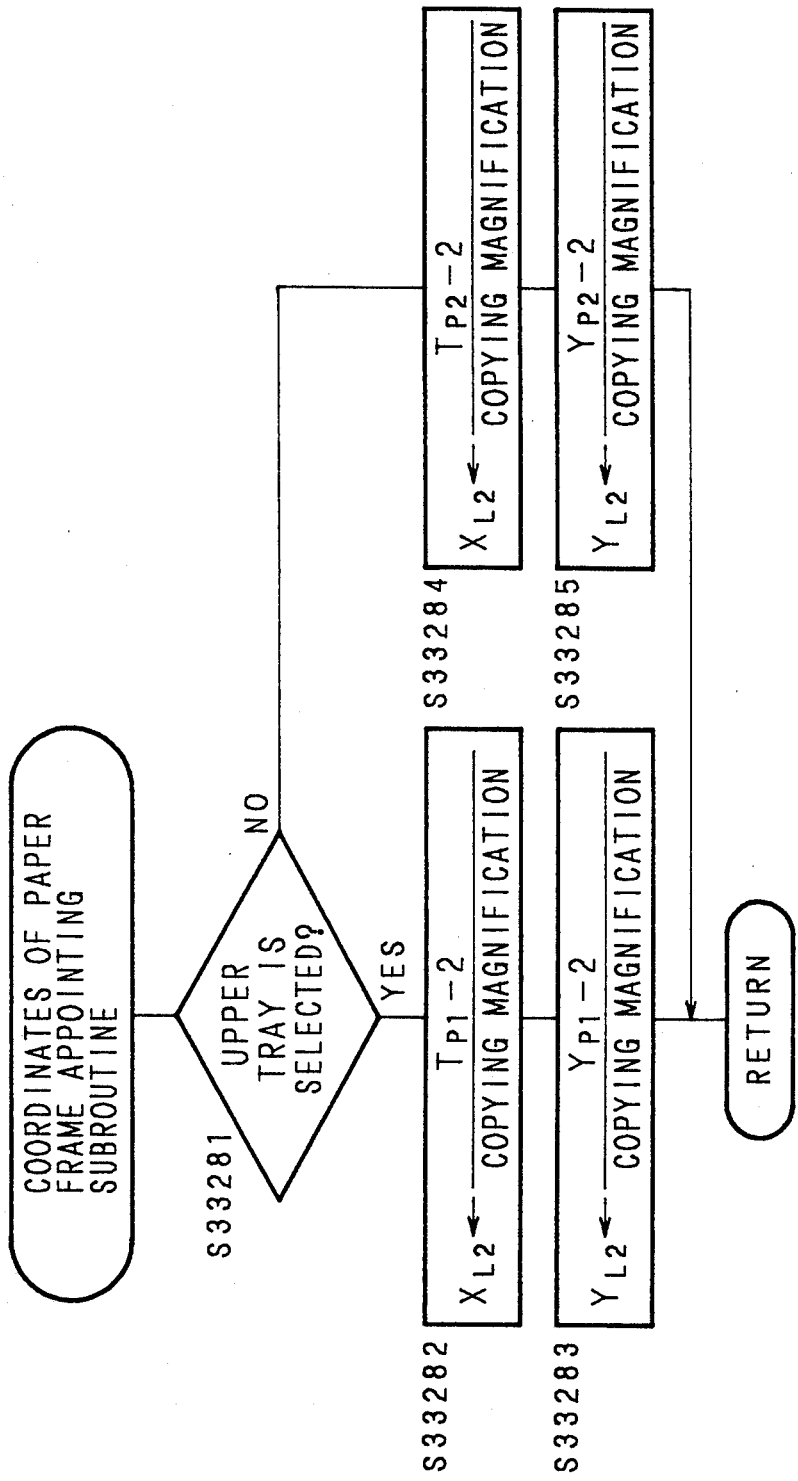

FIG. 43 is a schematic view showing the image monitor area 413 and a paper frame position corresponding to the entire area wherein the document image can be read in the second embodiment, in which a solid line (a) is the paper frame indicating the paper size. FIG. 44 is a flow chart showing the contents of a paper frame coordinates appointing routine in Step S3328 shown in FIG. 42. When the upper paper feed tray 50 is selected (Step S33281 YES), calculated results using the paper length data $T_{p1}$, paper width data $Y_{p1}$ and magnification in the upper paper feed tray 50 obtained by the paper size detecting routine in Step S16 (FIG. 12) are set to $X_L$, $Y_L$ (Steps S33282, S33283). Meanwhile, when the lower paper feed tray 50 is selected (Step S33281 NO), calculated results using the paper length data $T_{p2}$, paper width data $Y_{p2}$ and magnification in the lower paper feed tray 50 obtained by the paper size detecting routine in Step S16 (FIG. 12) are set to $X_L$, $Y_L$ (Steps S33284, S33285).

Figure 45:
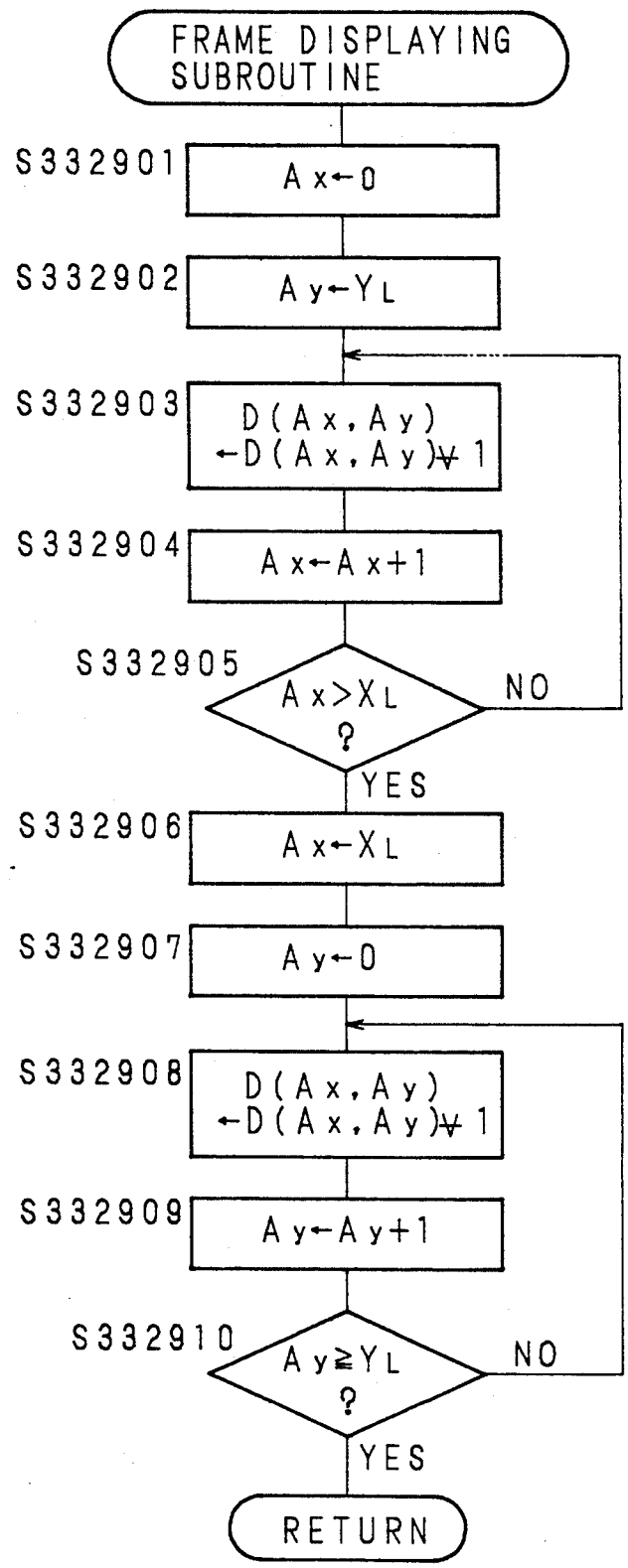

FIG. 45 is a flow chart showing the contents of a frame display routine in Step S3329 shown in FIG. 42, in which x-component address data Ax is set to 0 (Step S332901) and y-component address data Ay is set to $Y_L$ (Step S332902). Then, image monitor area display data D(Ax, Ay) in the address are inverted by taking Exclusive OR of the data till then and "1" (Step S332903), and Ax is added one by one (Step S332904). The processing is continued till Ax becomes larger than $X_L$ (Step S332905 NO), and a horizontal line is drawn from the coordinates (0, $Y_L$) to the coordinates ($X_L$, $Y_L$) in FIG. 43 by inverting OFF/ON of the liquid crystal contrary to the image data.

When Ax surpasses $X_L$ (Step S332905 YES), after setting Ax and Ay to $X_L$ and 0 (Steps S332906, S332907), the display data D(Ax, Ay) are inverted by taking Exclusive OR of the data till then and "1" (Step S332908) and Ay is added one by one (Step S332909). The processing is continued till Ay becomes or larger than $Y_L$ (Step S332910 NO), and a vertical line is drawn from a position (coordinates $X_L$, 0) to a position (coordinates $X_L$, $Y_L - 1$) of FIG. 43.

The paper frame 426 indicating the paper size contained in the paper feed tray selected is displayed in such a way on the liquid-crystal display panel 222 together with the document image. Since the paper frame changes responsive to the magnification, a range in the document to be copied can be confirmed simply even when the magnification is changed.

As described above in detail, in a copying apparatus of the present invention, since a frame indicating a document position is displayed on display means together with a document image, the operator can readily confirm a document setting condition beforehand, thus any useless copying operation due to mispositining of the document can be prevented.

Also, since the document image and a frame indicating a copiable area of paper are displayed together, the relative position between the document image and the copiable area can be confirmed before the copying operation, and the image can be formed surely within the paper at copying. It is also possible to know beforehand that in which area of the paper the image is to be copied.

Moreover, since the document image and the frame indicating the paper size is displayed together, and the frame size is changed according to the magnification set, even when arbitrary magnification is set, the relationship between the document image and paper can be confirmed easily before the copying operation, and miscopying caused by missetting of the document can be prevented beforehand.

Furthermore, when an area edition mode is selected, since the document image is displayed unconditionally, an image display is not necessary to be selected again after the area edition mode is selected. Thus, in editing and copying, the operation of selecting the image display can be omitted and operating procedures can be simplified.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A copying apparatus comprising:
   a document table onto which a document is placed;
   converting means for reading an image of a document placed on said document table and converting said image into an electrical signal;
   image forming means for forming said image on copy paper on a basis of said electrical signal;
   position detecting means for detecting a position of said document on said document table; and
   display means for displaying both said image of the document on the basis of said electrical signal and a document frame showing a contour of said document on a same displaying area, responsive to the document position detected by said position detecting means.

2. A copying apparatus as set forth in claim 1, wherein a reading resolution of said converting means is higher than a display resolution of said display means.

3. A copying apparatus as set forth in claim 1, wherein said position detecting means detects a position of four corners of a quadrangle document on the basis of said electrical signal to detect said document position.

4. A copying apparatus comprising:
   a document table onto which a document is placed;
   converting means for reading an image of a document placed on said document table and converting said image into an electrical signal;
   image forming means for forming said image on copy paper on a basis of said electrical signal;
   judging means for judging a copiable area of said document on said document table, which can be actually formed on the copy paper; and
   display means for displaying both said image of the document on the basis of said electrical signal and a frame indicating said copiable area judged by said judging means on a same displaying area.

5. A copying apparatus as set forth in claim 4, wherein said judging means includes size detecting means for detecting a size of the copy paper on which said image is to the formed.

6. A copying apparatus as set forth in claim 5, wherein said image forming means includes means for setting a copy magnification, and said judging means judges said copiable area from the size of the copy paper detected by said size detecting means and said copy magnification.

7. A copying apparatus comprising:
   a document table onto which a document is placed;
   converting means for reading an image of a document placed on said document table and converting said image into an electrical signal;
   image forming means for forming said image on copy paper on a basis of said electrical signal;
   size detecting means for detecting a size of the copy paper on which said image is to be formed; and
   display means for displaying both said image of the document on the basis of said electrical signal and a frame indicating said size of the copy paper detected by said size detecting means on a same displaying area.

8. A copying apparatus comprising:

a document table onto which a document is placed;

converting means for reading an image of a document placed on said document table and convering said image into an electrical signal;

display means for displaying said image of the document on a basis of said electrical signal;

area appointing means for appointing an arbitrary area in said image of the document;

image forming means for forming the image on copy paper on the basis of said electrical signal, said image forming means being operable in an image edition mode for editing the image according to the area appointed by said area appointing means;

setting means for setting said image edition mode; and control means for automatically starting an operation of said converting means and displaying said image of the document on said display means, when the image edition mode is set.

* * * * *